(12) United States Patent
Hagen

(10) Patent No.: US 8,262,343 B2
(45) Date of Patent: Sep. 11, 2012

(54) WET COMPRESSION APPARATUS AND METHOD

(75) Inventor: David L. Hagen, Goshen, IN (US)

(73) Assignee: Vast Power Portfolio, LLC, Elkhart, IN (US)

( * ) Notice: Subject to any disclaimer, the term of this patent is extended or adjusted under 35 U.S.C. 154(b) by 1142 days.

(21) Appl. No.: 11/913,369

(22) PCT Filed: May 2, 2006

(86) PCT No.: PCT/US2006/017119
§ 371 (c)(1),
(2), (4) Date: May 27, 2008

(87) PCT Pub. No.: WO2006/119409
PCT Pub. Date: Nov. 9, 2006

(65) Prior Publication Data
US 2008/0247885 A1     Oct. 9, 2008

Related U.S. Application Data

(60) Provisional application No. 60/676,917, filed on May 2, 2005.

(51) Int. Cl.
*F01D 25/12* (2006.01)
(52) U.S. Cl. ............... 415/116; 415/175; 415/1
(58) Field of Classification Search .......... 415/116, 415/119, 175, 199.5, 1
See application file for complete search history.

(56) References Cited

U.S. PATENT DOCUMENTS

| | | | |
|---|---|---|---|
| 2,647,368 A | 5/1950 | Triebbnigg et al. | 60/39.05 |
| 2,549,819 A * | 4/1951 | Kane | 415/116 |
| 3,009,682 A | 4/1952 | Johnson | 253/39.15 |
| 3,548,568 A * | 12/1970 | Carlson, Jr. et al. | 95/218 |
| 4,478,553 A | 10/1984 | Leibowitz et al. | 416/97 |
| 4,571,151 A | 2/1986 | Paul | |
| 6,453,659 B1 | 9/2002 | Van Liere et al. | 60/39.53 |

(Continued)

FOREIGN PATENT DOCUMENTS

DE    44 07 829 A1    9/1995

(Continued)

OTHER PUBLICATIONS

Office Action issued in corresponding German Patent Application No. DE 11 2006 001 149.9-15 dated May 18, 2011 (Total 5 pages).

(Continued)

*Primary Examiner* — Ninh H Nguyen
(74) *Attorney, Agent, or Firm* — Ostrolenk Faber LLP

(57) ABSTRACT

This wet compression invention with a vaporizable fluid mist demonstrates major performance improvements over the relevant art in achieving a high degree of saturation, providing sensible cooling, strongly reducing the temperature increase due to compression work, reducing excess diluent air flow for downstream combustion, reducing compression noise, and increasing the achievable compressor pressure ratio. These improvements are obtained by one or more of: high mist or overspray from a) progressive axial injection of vaporizable fluid along the streamwise compression flow path, and b) transverse vaporizable fluid delivery from stators, rotors, perforated tubes, and/or duct walls, matching the gaseous fluid flow distribution across the compressor stream; c) reducing the compressor cross-sectional flow area of downstream compressor stages relative to up-stream stages, and d) increasing the rate of downstream vaporizable fluid injection relative to the rate of upstream injection, as a function of each compressor stage pressure ratio.

20 Claims, 7 Drawing Sheets

U.S. PATENT DOCUMENTS

| | | | |
|---|---|---|---|
| 6,644,935 B2 * | 11/2003 | Ingistov et al. | 417/244 |
| 7,413,399 B2 * | 8/2008 | Trewin | 415/116 |
| 2006/0083605 A1 | 4/2006 | Harazim | 415/116 |

FOREIGN PATENT DOCUMENTS

| | | |
|---|---|---|
| DE | 44 07 829 A1 | 9/1995 |
| DE | 195 39 774 A1 | 4/1997 |
| DE | 199 00 026 A1 | 7/2000 |
| DE | 103 31 978 A1 | 2/2004 |
| EP | 0 781 909 A2 | 7/1997 |

OTHER PUBLICATIONS

International Preliminary Report on Patentability and Written Opinion issued Aug. 4, 2009.

* cited by examiner

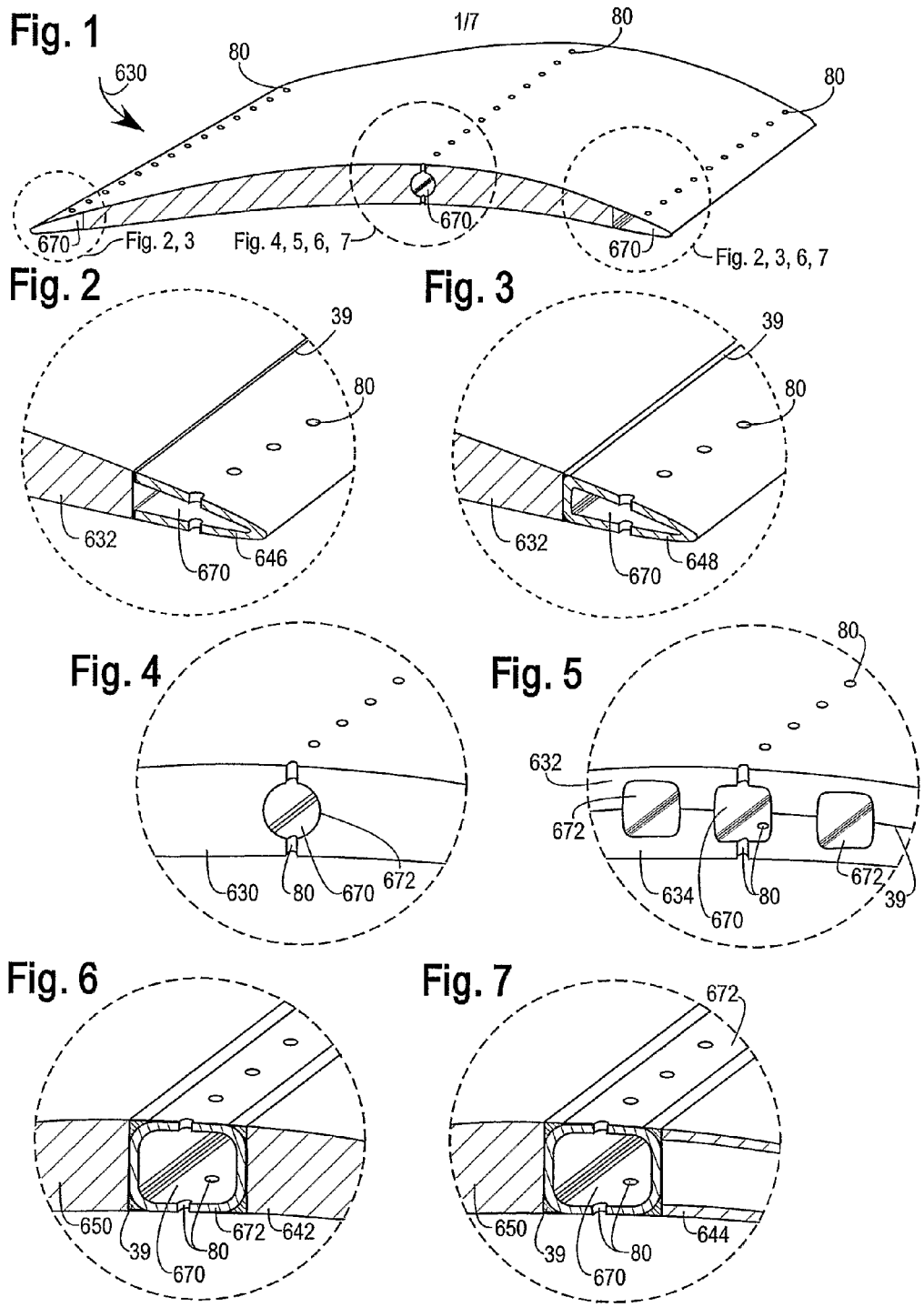

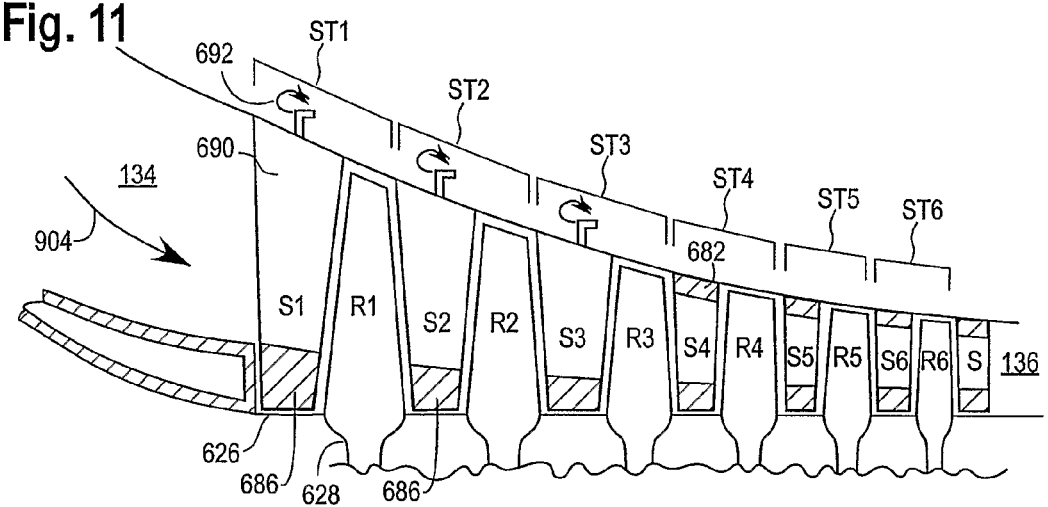
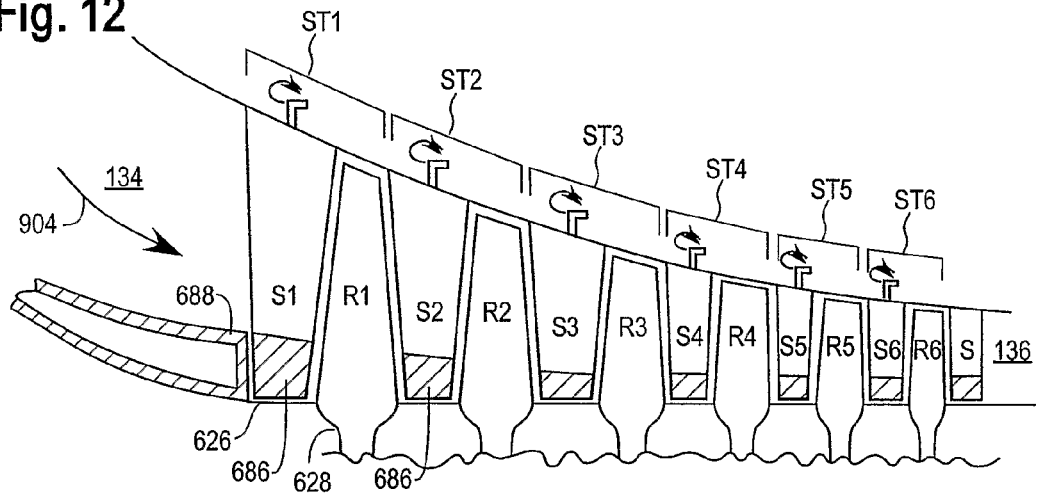

WET COMPRESSION APPARATUS AND METHOD

PRIORITY INFORMATION

This application is a claims priority under 35 U.S.C. §119 (e) of U.S. Provisional Application No. 60/676,917 filed May 2, 2005, which is incorporated by reference herein.

BACKGROUND OF THE INVENTION

1. Field of the Invention

The present invention relates to the fields of cooling gaseous fluids during compression and of diluted combustion.

2. Description of the Related Art

Conventional power systems experience major reductions in compressor capacity and net power with increasing ambient temperature, especially during summer peaking of demand. Some precooling or "fogging" of the intake air is being done upstream of the compressor. In relevant art, further water overspray has been used to entrain water droplets into the compressor intake to cool the air being compressed. Some systems provide intercooling between low and high pressure compressors using sprays of cooling liquid (or liquid diluent). Some relevant art uses flash evaporation and/or swirling nozzles have been used to reduce spray drop size.

Relevant art fogging, overspray, and intercooling technology experience limitations in the amount of water evaporated and/or entrained into the compressor because of operational limitations within the compressor, such as surge, choke, and stall as well as concerns over blade erosion. Non-uniform fogging and water overspray have been observed to impact downstream combustion spatial temperature distributions in axial turbines. These in turn degrade the desired downstream transverse temperature distribution at the inlet of the turbine. Such deviations from design can reduce turbine airfoil life and/or require lower mean temperatures that reduce system efficiency.

Efforts by relevant art to achieve full evaporation of the water before reaching the compressor airfoils and/or with the low degree of relative mixing prevents evaporative cooling from reaching or saturating much of the fluid flow being compressed especially at the downstream end of the compressor. Some relevant art advises putting most of the water spray nearer the upstream end of the compressor to increase the overall benefits from cooling flow.

SUMMARY OF THE INVENTION

Accordingly one embodiment of the present invention can comprise a compression system for compressing a gaseous fluid. In such an embodiment, the compressor can be provided with a gaseous fluid inlet and can include at least two compression stages configured along a curvilinear streamwise flow path. The compressor can also include a compressed fluid outlet and a delivery system for injecting into the gaseous fluid flow a cooling fluid comprising a vaporizable liquid. In this embodiment, the compressior is characterized in that the rate of injection of cooling fluid into the gaseous fluid flow increases in the streamwise flow direction across the at least two compression stages.

In another embodiment of the present invention a compression system for compressing a gaseous fluid comprises a compressor with a gaseous fluid inlet to a curvilinear compression duct. At least one compressor stage is within the duct. The compressor has at least one rotating member. The rotating member has a curvilinear streamwise flow path. A curvilinear transverse direction is distinct from the curvilinear streamwise flow path and is bounded by a first wall and a second wall. The compressor further includes a compressed fluid outlet and a delivery system for the injection of cooling fluid into the gaseous fluid. The compressor is characterized in that the delivery system can inject cooling fluid, comprising a vaporizable liquid, through orifices distributed across at least 50% of the distance between the compressor stage's first wall and the second wall, measured in said curvilinear transverse direction, for at least one stage, and further characterized in that the transverse distribution of cooling fluid delivery is nonlinear along said transverse direction.

Another embodiment of the present invention comprises method of cooling a gaseous fluid being compressed in at least one compressor portion distributed along a curvilinear stream wise flow. In this embodiment, the method can comprise delivering a vaporizable cooling fluid to the compressor portion along a curvilinear transverse line distinct from the curvilinear stream wise flow path direction, and bounded by a first wall and a second wall, wherein said transverse line includes a region closer to the center of the stream wise flow and a region closer to one of the first or second walls. The method can also comprise evaporating a fraction of the delivered cooling fluid in both said regions wherein the rate of cooling induced in the region closer to the center of stream wise flow is greater than the rate of cooling in the region closer to the first or second wall and wherein the cooling reduces the rate of heating due to compression.

Another embodiment of the present invention comprises a method of compressing and cooling a gaseous fluid distributed along a curvilinear stream wise flow through at least three compressor stages, comprising a rotor, or a stator and rotor. The method can comprise configuring an axial distribution of individual pressure ratios for the at least three compressor stages; configuring an axial distribution to deliver vaporizable cooling fluid; compressing the gaseous fluid; and delivering vaporizable cooling fluid into the gaseous fluid being compressed; such that evaporation of the vaporizable cooling fluid achieves at least a 50% degree of saturation of the gaseous fluid exiting the compressor stages.

Another embodiment of the present invention comprises a method of acoustic quieting of compressing gas with liquid to reduce compression noise by at least 2 dB relative to equivalent compression without liquid. In some embodiments, the method is characterized by a quieting fluid comprising a liquid is injected into the gaseous fluid through numerous orifices configured about one or more of: a stationary airfoil directing the gaseous fluid flow, a streamlined tube configured across the gaseous fluid flow; a rotary airfoil compressing the gaseous fluid flow; a duct wall constraining the gaseous fluid; further characterized in that, the noise is reduced in proportion to: the stage weighted mass flow ratio of unevaporated quieting fluid to gaseous fluid, relative equivalent gaseous fluid compression without the quieting fluid Yet another embodiment of the present invention is a method of cool compressing a gaseous fluid, the method comprising: configuring the BETA Tolerance ratio for a combination of at least a compressor duct, and a compressor stage comprising a rotor airfoil and optionally a stator airfoil; compressing a gaseous fluid in the compressor stage; and delivering a cooling liquid through at least one of at least one cooling passage within the gaseous fluid duct wall, at least one cooling passage within at least one airfoil, and numerous orifices configured about the at least one airfoil, between the at least one cooling passage and the gaseous fluid being compressed; wherein constraining the operating gap between the rotor airfoil and the compressor duct to at least greater than a prescribed relative rotor interference tolerance; and wherein the BETA Tolerance ratio of the compressor is at least 30% greater than the BETA Tolerance ratio of an equivalent compressor without the cooling liquid delivery.

BRIEF DESCRIPTION OF THE DRAWINGS

Having thus summarized the general nature of the invention and some of its features and advantages, certain preferred embodiments and modifications thereof will become apparent to those skilled in the art from the detailed description herein having reference to the figures that follow, each having features and advantages in accordance with one embodiment of the invention, of which:

FIG. 1 Compressor airfoil with typical regions of cooling fluid delivery in some configurations.

FIG. 2 Cooling fluid orifices in V wall along an airfoil edge.

FIG. 3 Perforated tube forming a cooling duct with orifices along an edge of an airfoil.

FIG. 4 Manifold drilled into a compressor airfoil having orifices through the airfoil surface.

FIG. 5 Two portions of an airfoil bonded together to form a fluid duct with orifices.

FIG. 6 A perforated tube forming a manifold with orifices within an airfoil.

FIG. 7 A perforated manifold between solid and hollow portions of an airfoil.

FIG. 11 An axial wet compressor having some variable guide vanes and configured with inner and outer flow constrictors.

FIG. 12 An axial wet compressor having variable guide vanes with inner flow constrictors.

Figure 8:
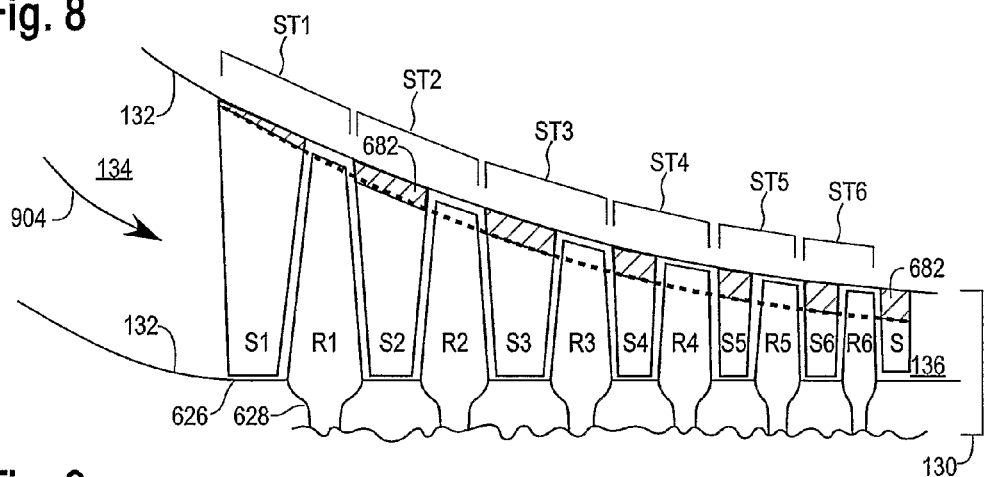
FIG. 8 An axial wet compressor configured with outer flow constrictors.

Table 1 Progressive Wet Compression in Equal Pressure Ratio Stages

Table 2 Dry Compression versus Progressive Saturated or Overspray Wet Compression Table 3 Specific Volume for Dry versus Progressive Wet Compression Table 4 Polynomial Coefficients for "1—W/D" versus "Natural Log of BETA"

DETAILED DESCRIPTION OF THE PREFERRED EMBODIMENTS

The invention discloses methods of "wet compression" or quasi or pseudo iso-thermal compression of gaseous fluid. i.e., for delivering a vaporizable liquid diluent into a gas or vapor containing fluid being compressed. e.g., spraying water into air that is being compressed in order to reduce the compression pumping work. The liquid diluent is primarily delivered through numerous orifices within a gas-containing fluid compressor to absorb heat from compression work. Some diluent is preferably entrained into the fluid entering the compressor. The diluent delivery transverse to the streamwise is preferably non-linear to account for the peaked gaseous fluid flow and differential residual drop entrainment due to evaporation.

Some Objects and Advantages of Selected Embodiments

Several objects and advantages of this invention are:
Cooling Compression:
To reduce the specific work of compressing a gaseous fluid;
To increase the net power producible by a compressed fluid power system;
To improve control over the transverse fluid composition within and exiting a compressor;
To increase the portion of diluent vaporizable within existing compressors;
To control the portion of vaporized and optionally liquid diluent in a compressed fluid;
To reduce the amount of diluent evaporated downstream of the compressor;
To improve compressor cleaning while constraining droplet erosion and improving durability of compressor components;
To reduce the noise generated in compressing a fluid;
To reduce the noise generated by compressing a fluid and the work of compressing it;
To enable desired compressor operating regimes with high diluent delivery;
To provide high, saturating, or overspray diluent flows in centrifugal compressors;
To cool compressor components;
Pressurized combustion—forming a hot pressurized fluid:
13 To reduce the specific work of producing a hot diluted pressurized fluid;
14 To increase the portion of diluent within a diluted pressurized fluid;
15 To reduce the relative actual to desired variability of diluent in a compressing fluid;
High pressure power system with wet cooled compression:
16 To increase the efficiency of generating mechanical or electrical power;
17 To increase the net power achievable per mass flow through an expander;
Controlling compression:
18 To configure compressors for desired ratios of diluent to flow of fluid being compressed;
19 To configure compressors for desired compressed fluid composition in power systems;
20 To enable varying the outlet ratio of diluent to fluid being compressed;
21 To enable varying the flow of primary gaseous fluid being compressed;
22 To enable varying the ratio of diluent delivered during versus after compression.
Further objects and advantages will be apparent from consideration of the drawings and following description.

Diluent may be delivered into the compressed fluid downstream of the compressor and upstream of a subsequent fluid constriction, such as a downstream gas turbine. The compressor compresses the gaseous fluid through at least one and preferably a series of compressor stages each having a pressure ratio beta(i) of the outlet pressure to the inlet pressure of that $i^{th}$ compressor stage. The gaseous fluid is compressed to a cumulative compression ratio BETA of the outlet pressure to the inlet pressure of the compressor, comprising the product of the beta(i) of the individual compressor stages. As diluent vaporizes, it absorbs latent heat and often sensible heat, cooling the surrounding fluid, and reducing the compression pumping work. Cooling compressed diluent downstream of the compressor reduces the fluid volumetric flow through the downstream fluid constriction. This also reduces the pressure volume work of fluid compression.

The gaseous fluid may be any fluid comprising a gas. It typically comprises a gaseous reactant or co-reactant, e.g., a gaseous hydrocarbon fuel, and/or an oxidant such as air. The vaporizable liquid may be any liquid capable of vaporizing within the compression process. The vaporizable liquid preferably comprises water. The vaporizable liquid may comprise an inorganic liquid such as carbon dioxide, a vaporizable oxygenated hydrocarbon such as methanol, or ethanol, a vaporizable hydrocarbon such as propane or other hydrocarbon, or a vaporizable reactant liquid as desired.

The compressor is preferably controlled and/or reconfigured to efficiently accommodate the desired changes in mean flow with compressor stage relative to conventional air flow. Compressors may be retrofitted to accommodate the desired changes in flows. To increase net power, the flow rate in a wet compressor is reduced (relative to the expander flow and/or similar dry air compressor flow of conventional design). Furthermore, the compressor streamwise mean flow area is preferably reduced non-uniformly. E.g., with proportionally more area reduction downstream than upstream relative to a conventional "dry" compressor. Similarly, the upstream axial compressor flow area profile may be increased over dry compression. Such measures accommodate the reduction in molar specific volume due to progressively increasing streamwise cooling.

This invention incorporates by reference U.S. patent application Ser. No. 10/686,191, "Method and apparatus for mixing fluids" by David L. Hagen et al. filed Oct. 15, 2003 Published Mar. 17, 2005, Publication No. 20050056313 (herein VAST.001 technology). This VAST.001 Distributed Contactor technology incorporated by reference disclosed methods to improve configuration and control over the transverse distribution of diluent delivery. It further disclosed methods to control the diluent/compressed flow ratio transverse distribution, providing substantial improvements over the relevant art. This included pre compressor, inter compressor, and inter compressor-turbine distributed diluent delivery. It further taught intra-compressor distributed delivery.

Wet Compression: With reference to FIG. 84 of the VAST.001 technology incorporated by reference, at least one perforated direct contactor is preferably used for "intra-compression drop delivery within a compressor" "407" used to pressurize or compress the gaseous fluid or "second fluid 904." Vaporizable cooling liquid or First Fluid is preferably delivered into the compressor intake. Inter-compressor cooling fluid delivery and delivery upstream and downstream of the compressor is further described. FIG. 84 of VAST.001 shows a combustor 424 downstream of the compressor 407 and an expander 440 downstream of the combustor 424.

Streamlined Direct Contactor: With reference to FIG. 35, FIG. 48, FIG. 49 of the VAST.001 technology, the perforated contactor within a compressor may be round. The contactor is preferably streamlined at least with an elliptical cross section. FIG. 36, FIG. 40, FIG. 46 in the VAST.001 technology the perforated direct contactor within a compressor is preferably further streamlined with a downstream portion narrower than the upstream portion.

Airfoil with fluid passage and orifice: With reference to FIG. 47 of the VAST.001 technology, the perforated direct contactor is more preferably shaped like an airfoil. The direct contactor may be configured "along compressor vanes" or "along the compressor blades", or may be "combined into the vane and blade shapes with orifices exiting the vane or blade surfaces." Such direct contactors incorporate at least one fluid passage to deliver fluid from a cooling fluid manifold into and through the stator vane or rotor blade and out through at least one orifice and preferably through numerous orifices positioned about the vane and/or blade.

Manifold: The VAST.001 technology shows cooling fluid being preferably delivered through a port in a duct wall or pressure vessel and distributed through the manifold located radially inward from the outer surface of the duct or pressure vessel. E.g., as shown in FIG. 1, FIG. 16, FIG. 17, 68. FIG. 52, FIG. 53, FIG. 60, FIG. 62, and FIG. 68. Herein, the manifold may be formed within the pressure vessel or duct wall, and be provided with fluid ports to provide fluid communication with the turbomachine airfoil. E.g., with a stator vane.

Transverse Delivery Distribution: With reference to FIG. 18 of the VAST.001 technology, the first fluid or 901 cooling fluid is preferably delivered through the perforated direct contactor with a non-linear distribution in the direction transverse to the streamwise flow. The fluid delivery is more preferably configured to provide a prescribed jet penetration profile transverse to the streamwise flow between the inner and outer radius of the turbomachine or compressor.

Evaporation Distance: FIG. 19 of the VAST.001 technology teaches configuring the transverse distribution of cooling fluid delivery to provide transverse distributions of a prescribed maximum drop size, and a maximum evaporation distance and/or maximum evaporation time.

With reference to FIG. 20 of VAST.001, the cooling fluid delivery is preferably configured to account for the delivery of cooling fluid pressure distribution along a fluid channel within the airfoil. The orifice spacing and orifice diameter are preferably configured to provide a transverse distribution of the desired flow ratio of gaseous second fluid to cooling first fluid.

Fluid Delivery Perpendicular to Airfoil: The distribution of cooling fluid delivery is preferably further configured in a direction distinct from the streamwise flow path and the direction transverse to that flow path, preferably perpendicular to the airfoil. FIG. 23 of VAST.001 shows orifices positioned about the direct contactor that provide sprays into differing locations into the streamwise gaseous fluid flow. FIG. 24 through FIG. 33 of VAST.001 show further ways to distribute the cooling fluid into the surrounding gaseous fluid flow. FIG. 60 of VAST.001 further shows multiple direct contactors oriented radially within the fluid duct spraying cooling fluid circumferentially into the gaseous fluid. FIG. 61 of VAST.001 shows a schematic of the wet compressor system comprising a fluid delivery system for the gaseous $2^{nd}$ fluid, and for the cooling liquid First fluid.

This invention further incorporates by reference U.S. patent application Ser. No. 10/763,047 Trifluid Reactor by David L. Hagen et al. filed Jan. 22, 2004 Published Nov. 4, 2004 Pub. No. 20040219079 (herein VAST.002 Trifluid Reactor technology). FIG. 2 of VAST.002 Trifluid Reactor technology incorporated by reference, disclose methods to improve control over transverse diluent delivery in a combustor downstream of the compressor and upstream of an expander. FIG. 14, FIG. 16, FIG. 18, and FIG. 19 of VAST.002 further show diluent delivered within a diffuser, downstream of the compressor and upstream of the combustor. FIG. 38 of VAST.002 shows a contactor comprising multiple fluid passages.

This invention further incorporates by reference U.S. patent application Ser. No. 10/763,057 "Thermodynamic cycles using thermal diluent" by David L. Hagen et al. filed Jan. 22, 2004 Published Dec. 2, 2004 Publication No. 20040238654 (herein VAST.003 Power System technology). This describes a wet compressor, wet combustor, expander, and heat exchange system recovering exhaust heat into thermal diluent. It further teaches recovering heat from the fluid downstream of the compressor into thermal diluent and delivering the heated diluent fluid upstream into the compressor to cool oxidant fluid being compressed.

In the present invention, these methods are further developed to accommodate reconfiguring compressors for wet compression. They are improved to provide more desirable diluent evaporation rates. Furthermore, diluent delivery is improved to accommodate desired transverse evaporation rates for multiple compressor stages or streamwise locations.

With combustion or chemical reaction, such methods enable beneficially moving a substantial portion of total diluent delivery from within the combustor to delivery upstream within the "wet compressor". Such methods can significantly reduce wet compression power. Delivering portions of the desired diluent within the compressor further reduce or eliminate the requirement for humidification towers and/or diluent delivery equipment downstream of the compressor.

Liquid diluent is preferably delivered to provide desired evaporation rate distributions in the transverse and streamwise directions. To achieve this, liquid diluent (e.g. water) is preferably delivered at a rate that varies non-uniformly in the streamwise direction. E.g., generally increasing diluent delivery with stream-wise stage number. The transverse distribution of water delivery rate is preferably adjusted to be non-linear, and increasingly non-linear in relation to the increasingly peaked transverse distribution of compressed fluid flow. The water temperature and delivery rate may be configured to achieve desired and varying evaporation rate distributions within the air flow. These diluent delivery methods may use variations in orifice size or diameter, orifice spatial density, and differential ejection pressure.

Further methods are disclosed to more beneficially deliver diluent through one or more of perforated direct contactors, stationary airfoils (stators) and/or moving airfoils (vanes). Methods are also disclosed to provide sensible cooling of compressor components in addition to diluent delivery into the fluid being compressed.

Such wet compression configuration and compressor redesign or retrofit to enable humid or wet power cycles with substantial increases in system efficiency, and/or specific power, with corresponding benefits in thermoeconomic performance. Such major reductions in flow being compressed provide major reductions in acoustic noise generated. Further methods are disclosed that may be used to reduce acoustic noise together with delivering diluent within a wet compressor.

For some embodiments, a preferable method for liquid cooling during gaseous compression is to establish criteria for cooling liquid delivery, obtain the desired compressor mean flows, and provide means to deliver the cooling liquid as discussed herein.

With reference to FIG. 1, one embodiment of the invention uses a fluid compression system with a gaseous fluid compressor comprising plurality of airfoils 630. The compressor has a fluid inlet for a gaseous fluid comprising a gas, a compression duct to progressively compress gaseous fluid along an axial or curvilinear streamwise flow direction. Such systems are further detailed in the technology incorporated by reference VAST.001 Direct Contactor, VAST.002 Trifluid Reactor and VAST.003 Thermal Cycles.

The fluid compression system further comprises a cooling liquid fluid system in fluid communication with the gaseous fluid upstream, within or downstream of the compressor. The cooling fluid system comprises at least one liquid pump and a cooling liquid delivery system comprising numerous orifices. The pump delivers cooling liquid through one or more fluid passages 670 within the airfoil 630. The fluid passages 670 are in fluid communication with numerous orifices 80. Cooling liquid is delivered through the orifices 80 to form liquid drops that mix and exchange heat with the surrounding gaseous fluid being compressed.

The fluid compression system comprises a compressor outlet, and duct with an outlet to deliver a cooled compressed fluid comprising compressed gaseous fluid and one or both of cooling liquid vapor and/or cooling liquid drops. This compression system is typically part of a system having a downstream fluid flow constriction which creates a back pressure on the compressor. E.g., a gas turbine comprising a "throat" or flow constriction formed by stationary and/or rotary airfoils.

For example, consider a conventional gas turbine power system comprising a multistage compressor, a combustor and an expander. With reference to Table 1, in one embodiment, the compressor is configured with ten equal compression stages to compress air to a cumulative pressure ratio BETA of about twenty. With reference to Table 2, and FIG. 14, compressing normal dry air from conventional conditions of one atmosphere at 15 deg C. and 60% humidity, to twenty atmospheres increases the outlet temperature to 455 deg C. (850 deg F.). (Calculated using Thermoflex ver. 14.)

The compressor is preferably reconfigured to wet compression to handle the same inlet air flow and overall compression ratio. Filtered or purified cooling water is preferably sprayed along the multi-stage compression path so as to effectively saturate the air being compressed progressively through the compressor. With reference to Table 1, the water delivered and evaporated per stage is assumed delivered at the inlet to each rotating compression blade stage.

TABLE 1

Progressive Wet Compression in Equal Pressure Ratio Stages

| Stage # | Cumulative BETA | Water/Stage kg/s (lb/s) | Cumulative Water kg/s (lb/s) | Water/Air % @ stage # | Increment/ Stage W/A | Cumulative Water/Air % |
|---|---|---|---|---|---|---|
| 1 | 1.35 | 0.15 (0.32) | 0.15 (0.32) | 0.175% |  | 0.18% |
| 2 | 1.82 | 0.50 (1.10) | 0.65 (1.42) | 0.602% | 0.427% | 0.78% |
| 3 | 2.46 | 0.59 (1.29) | 1.24 (2.71) | 0.706% | 0.104% | 1.49% |
| 4 | 3.31 | 0.65 (1.44) | 1.89 (4.15) | 0.788% | 0.082% | 2.28% |
| 5 | 4.47 | 0.71 (1.56) | 2.60 (5.71) | 0.854% | 0.066% | 3.13% |
| 6 | 6.03 | 0.75 (1.66) | 3.35 (7.37) | 0.909% | 0.055% | 4.04% |

TABLE 1-continued

Progressive Wet Compression in Equal Pressure Ratio Stages

| Stage # | Cumulative BETA | Water/Stage kg/s (lb/s) | Cumulative Water kg/s (lb/s) | Water/Air % @ stage # | Increment/ Stage W/A | Cumulative Water/Air % |
|---|---|---|---|---|---|---|
| 7 | 8.14 | 0.79 (1.75) | 4.14 (9.12) | 0.958% | 0.049% | 5.00% |
| 8 | 10.99 | 0.82 (1.81) | 4.96 (10.93) | 0.991% | 0.033% | 5.99% |
| 9 | 14.82 | 0.85 (1.88) | 5.81 (12.81) | 1.029% | 0.038% | 7.02% |
| 10 | 20.00 | 0.90 (1.99) | 6.71 (14.80) | 1.089% | 0.060% | 8.11% |

Assumptions: Air flow 82.87 kg/s, 182.7 lb/s. Ten equal pressure ratio stages of $10^{th}$ root of 20

In this embodiment, at least a small portion of water (0.175% of air by mass) is preferably added upstream of or at the compressor inlet and/or in the first stage to nominally saturate the flow from 60% Relative Humidity. Thereafter, sufficient progressive water spray is preferably added along the compressor flow path to nominally saturate the progressively hotter flow with increasing stage number and cumulative pressure ratio BETA. (This simplified model assumes continuous saturation.) With equal pressure ratio compressor stages, such liquid diluent delivery per stage preferably increases nonlinearly with compressor stage number or cumulative pressure ratio BETA in the fluid being compressed. E.g., a water spray evaporated per stage varying from about 0.602% of air flow by mass at the second compressor stage, to about 1.089% of the air flow by mass at the tenth stage.

Unexpectedly, though the cumulative pressure ratio and temperature are increasing faster than linearly, the increment in water delivery per stage preferably decreases axially along the compressor after the initial compensation for the inlet humidity, until near the outlet in this configuration. E.g., from about 0.104% of air flow between the $2^{nd}$ and $3^{rd}$ stages to 0.033% between the $7^{th}$ and $8^{th}$ stages, and then increasing again to 0.060% in this configuration. In other configurations, progressive cooling fluid delivery is preferably adjusted to compensate for lower and higher temperatures, and/or differing evaporative rates observed with other fluids and/or lower and higher pressure compressors, especially in downstream stages.

Overspray: In some embodiments, cooling liquid such as water is provided at numerous locations within the compression process, about and along the compressor, to progressively form an over spray of fine drops. Providing this excess mist in the fluid being compressed (e.g., air) traversing compression blade stages beneficially evaporates and more thoroughly saturates the air. The overspray further absorbs sensible heat from the gaseous fluid being compressed. This may be modeled by providing for a prescribed degree of mist of overspray at the inlet to each compression stage that further humidifies the air being compressed towards a desired degree of saturation within that stage. The overspray further provides direct contact sensible cooling by the liquid diluent overspray of the fluid being compressed.

In the configuration shown in Table 1, the cumulative water evaporated increases from about 0.18% in the first stage to about 8.11% of the air flow by mass in the compressor outlet at a pressure ratio BETA of 20. This total cumulative water delivery is more than four times the inlet overspray of about 1% to 2% by mass of conventional inlet overspray compression. (Conventional air compressors limit the desired diluent delivery due to operational problems such as surge and choke.)

Progressive Heat Exchange: More generally, with gaseous fluid compression through a compressor, the gaseous fluid being compressed becomes progressively more pressurized and hotter with streamwise flow. A heat exchange, cooling, or vaporizable liquid is preferably progressively added to the gaseous fluid to cool the fluid within the compression process. I.e., upstream, within, or downstream of the compressor. The cooling liquid preferably evaporates and absorbs latent heat from the gaseous fluid. It may transfer sensible heat and/or radiation to or from one or more of the fluid, the compressor airfoils, and/or the compressor duct. The liquid may react with the gaseous fluid endothermically or exothermically. E.g., by absorbing or releasing heat in chemical reactions.

Desired Fluid Cooling Rates: The cooling liquid is preferably added to the gaseous fluid being compressed at numerous locations within the compression system at prescribed rates. The cooling liquid is preferably progressively delivered at numerous orifices to control multiple streamwise delivery rates. These cooling liquid delivery rates are configured and/or controlled to provide desired streamwise cooling rates to the gaseous fluid being compressed at multiple streamwise locations. E.g., controlled at multiple and preferably all compressor stages. More preferably, these cooling fluid delivery rates through numerous orifices are configured for at least some airfoils, and preferably all stator and rotor airfoils. The cooling liquid delivery is preferably configured to provide a desired streamwise distribution of the gaseous fluid cooling rates.

Compression stages are generally configured with differing pressure ratios along a curvilinear streamwise path. The desired cooling rates may be configured as a desired ratio of the rates of compression heating of the gaseous fluid. More preferably, these desired cooling rates are prescribed as a generally nonlinear spatial distribution of cooling rates along the curvilinear compression path for a particular compressor.

Degree of Saturation: In some configurations, this cooling rate may be prescribed as the cooling achieved by a prescribed degree of saturation of the gaseous fluid by the cooling liquid at a sequence of locations along the curvilinear compressor path. For instance, the compressor may be described as a sequence of pressurizing stages with respective pressure ratios. The cooling rate distribution may be described as the amount of cooling liquid evaporation desired within each of those respective pressurizing stages. E.g., the degree of vaporization may provide a degree of saturation of at least 50%.

Saturation Degree Axial Distribution: The cooling rate distribution is preferably described as a detailed discrete distribution or a pseudo continuous spatial distribution of the fraction of the degree of saturation of the gaseous fluid desired with the cooling fluid along the streamwise compression path. The desired axial distribution of degree or fraction of saturation is preferably specified as an axially curvilinear distribution. E.g., as a practically achievable portion of the generally non-linear axial distribution of degree of unsaturation of the compressed air.

For example, distributions of upper and lower bounds of the degree of saturation are preferably prescribed at each compressor stage. The fluid delivery orifices are preferably configured and cooling fluid is delivered into the gaseous fluid to provide at least the prescribed lower degree of saturation. The fluid delivery orifices and cooling fluid delivery are further configured to provide a degree of saturation less than the prescribed upper saturation bound. A corresponding axial distribution of compressor stage cross sectional flow areas is preferably configured for the mean saturation degree obtained as the average of the upper and lower bounds at each stage.

Equal Compressor Stages: With further reference to Table 1, one configuration of a multistage compressor is shown with ten nominally equal compression stages of compression ratio, giving an overall pressure ratio of about 20. Air nominally at standard conditions of one atmosphere, 15 deg C. (59 deg F.) and 60% relative humidity is delivered to the compressor. Cooling water nominally at ambient temperature of 15 deg C. is injected into the air flow. The portion of water evaporation desired to effectively saturate the flow strongly increases with increasing compression along the streamwise flow. The water evaporation further increases nonlinearly with streamwise flow even with equal compression stages.

E.g., in this example of ten compressor stages, each compressing the air by an equal pressure ratio, the water evaporation desired strongly increases nonlinearly from about 0.60% of air mass flow to saturate the air between stages 2 and 3 to about 1.09% of the air mass flow to saturate the air between stage 10 and the compressor outlet. In practice the evaporative cooling will usually approach but not fully achieve theoretical saturation. Thus, a practical desired degree of saturation is preferably used.

Saturation degree Sigma: To model partial saturation, a saturation degree parameter Sigma is preferably included for wet compression systems. E.g., Sigma=actual water divided by amount of water to saturate the flow for adiabatic compression to the same pressure ratio. E.g., with increasing orifices and sprays, a saturation degree Sigma may be about 40% or more, preferably 67% or more, more preferably about 90% or more, further preferably about 95% or more, more further preferably about 97%, and most preferably about 99% of saturation at that axial location.

Direct Contact Sensible Cooling: This fluid cooling by evaporation is preferably further increased by adding sensible cooling from an additional fine mist of water. This additional cooling liquid mist or overspray may be used to sensibly cool the gaseous fluid by direct contact heat exchange with a high contact surface area.

In some configurations, the overall desired portion of cooling liquid to be added as diluent within the larger energy processing system is higher than the amount that evaporates during wet compression. Even after achieving a high degree of saturation, further liquid coolant is preferably delivered as an overspray to obtain further benefit from further cooling within the compressor rather than downstream.

Such additional overspray of fine mist further cools the gaseous fluid within the compression system, further reducing the pumping work of compressing the gaseous fluid. However, power is required to accelerate the cooling mist using the compressor. As further cooling liquid mist is delivered, the pumping work by the compressor may eventually increase in some configurations. However, providing a cooling overspray within the compressor may provide some decrease in pumping work to deliver the cooling liquid downstream of the compressor. The overall net specific work may still decline. I.e., the work of gaseous compression plus liquid pumping work per combined mass flow of gaseous fluid plus cooling fluid.

The rate of delivery of such additional cooling liquid as mist or overspray is preferably increased until increasing cooling liquid begins to reduce the gross combined work of compressing the gaseous fluid and delivering total diluent into one or more of the compressor and downstream components. E.g., until reduced compression efficiency from increasing gaseous turbulence, drag from liquid along the duct walls, imbalance, component erosion, imbalance fatigue etc. offsets benefits of further delivery of coolant liquid.

Near Saturation Evaporative Cooling and Overspray Cooling

Figure 14:
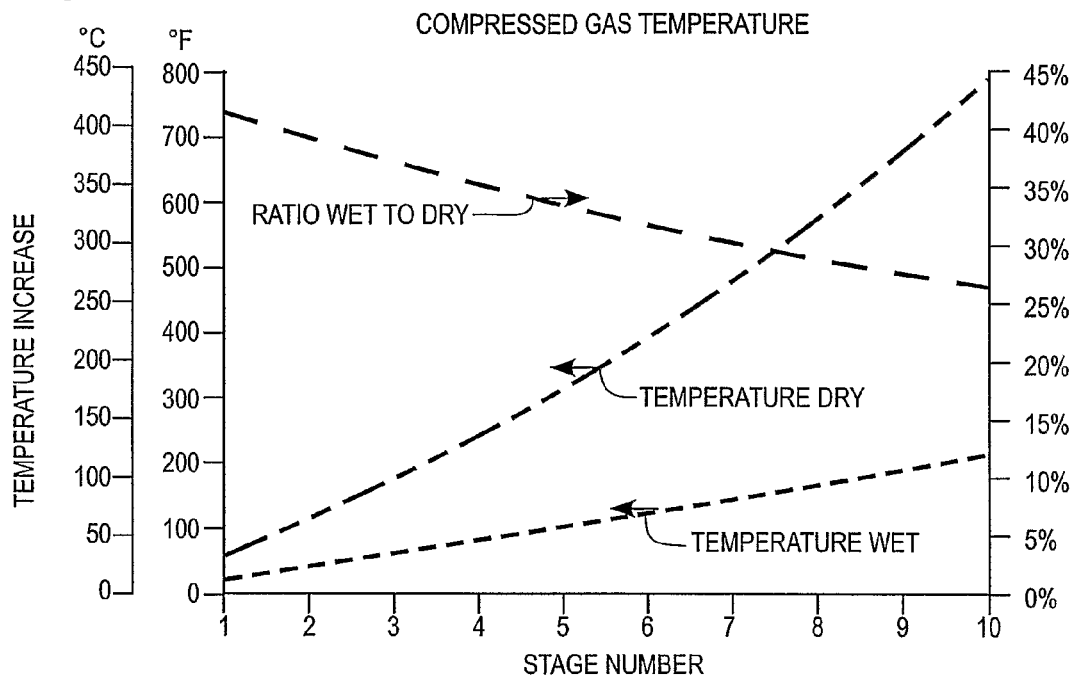
FIG. 14 A diagram of the temperature increase in wet and dry compression and the ratio of wet to dry temperature increases.

Dry Compression: With reference to FIG. 14 and Table 2, in the relevant art, air is compressed to a cumulative pressure ratio BETA of about 20 from nominal standard conditions of about one atmosphere at 60% relative humidity and 15 deg C. In this example, the ten stages each compress the air by about an equal pressure ratio.

Cool Saturating Wet Compression: In one liquid cooling or "wet compression" configuration, the gaseous fluid or air being compressed is nominally about saturated with water at each compressor stage. E.g., FIG. 8 shows a turbomachine or compressor comprising six stages each comprising a stator airfoil and a rotor airfoil. In a similar configuration, a wet compressor may comprise ten equal compressor ratio stages. For initial modeling, assume the water is delivered and evaporated about at the inlet of each compressor stage. e.g., a wet compression configuration that progressively saturates compressing air flow delivers a cumulative 15 deg C. (59 deg F.) cool water spray of about 8.09% mass ratio to the air flow at a cumulative compression ratio BETA of 20 by the compressor outlet.

This progressive wet compression to about saturation is shown in Table 1 and Table 2. It reduces the temperature of the humid compressed air at the compressor outlet from about 455 deg C. (850 deg F.) down to 155 deg C. (312 deg F.) assuming continuous saturation with cool water at 15 deg C.

FIG. 14 schematically depicts this cool wet compression configuration shown in Table 1 and Table 2. The TEMPERATURE DRY line depicts the temperature of air being compressed for relevant art dry compression as increasing 440 deg C. (791 deg F.) from 15 deg C. (59 deg F.) to about 455 deg C. (850 deg F.) The TEMPERATURE WET line depicts the temperature resulting from progressive wet compression. This reduces the fluid temperature increase by 68.1% to about 140 deg C. (253 deg F.). i.e., to give an outlet temperature of about 155.3 deg C. (320 deg F.) for nominally saturating wet compression for a cumulative pressure ratio BETA of 20.

TABLE 2

Dry Compression versus Progressive Saturated or Overspray Wet Compression

| | | | Wet Compression Cooling Water Temperature | | | |
|---|---|---|---|---|---|---|
| | | | 15° C. 59° F. | 65.6° C. 150° F. | 15° C. 59° F. | 65.6° C. 150° F. |
| | | | | Dry, Saturated or 2% overspray | | |
| | | Dry | Saturatd | Saturatd | 2% Over | 2% Over |
| Total Power | kW | 38 364 | 30 223 | 30 592 | 30 637 | 30 985 |
| Total Power/Mass flow | kW s/kg | 463.0 | 337.3 | 339.3 | 335.3 | 336.9 |
| | kW s/lb | 210.0 | 153.0 | 153.9 | 152.1 | 152.8 |
| Ratio to Dry Power/Mass Flow | | 100% | 72.85% | 73.28% | 72.42% | 72.76% |
| Total Water Injection Mass Rate | kg/s | — | 6.70 | 7.30 | 8.52 | 9.13 |
| | lb/s | — | 14.78 | 16.09 | 18.78 | 20.13 |

TABLE 2-continued

Dry Compression versus Progressive Saturated or Overspray Wet Compression

| | | | Wet Compression Cooling Water Temperature | | | |
|---|---|---|---|---|---|---|
| | | | 15° C. 59° F. | 65.6° C. 150° F. | 15° C. 59° F. | 65.6° C. 150° F. |
| | | | Dry, Saturated or 2% overspray | | | |
| | | Dry | Saturatd | Saturatd | 2% Over | 2% Over |
| Water to Inlet Air mass ratio | m/m | — | 8.09% | 8.81% | 10.28% | 11.02% |
| Total Mass Flow Out | kg/s | 82.87 | 89.59 | 90.17 | 91.39 | 92.00 |
| | lb/s | 182.7 | 197.5 | 198.8 | 201.5 | 202.8 |
| Outlet Absolute Temperature | kelvins | 727.9 | 428.4 | 431.4 | 404.4 | 406.8 |
| | Rankine | 1309.8 | 771.2 | 776.6 | 727.9 | 732.2 |
| Absolute Temp. Ratio Twet/Tdry | k/k | 100% | 58.88% | 59.29% | 55.57% | 55.90% |
| Outlet Temperature Increase | kelvins | 439.5 | 140.3 | 143.3 | 116.2 | 118.6 |
| | Rankine | 791.2 | 252.5 | 257.9 | 209.2 | 213.5 |
| Absolute Temperature Ratio | Tout/Tin | 252.5% | 148.7% | 149.7% | 140.3% | 141.2% |
| Abs Temp ratio versus Dry case | k/k | 100% | 58.88% | 59.29% | 55.57% | 55.90% |
| Temp Increase versus Dry case | k/k | 100% | 31.92% | 32.60% | 26.45% | 26.99% |

Ten equal compressor ratio stages to BETA 20. Inlet air at 15° C. 60% RH. Water delivered and evaporated at stage inlet.

Work Reduction from Cool Wet Compression: In FIG. 14, the line RATIO Wet/Dry shows the ratio of the gaseous fluid absolute outlet temperature under progressive wet compression compared to "dry" compression against stage number along the streamwise flow. (e.g., assuming a constant pressure ratio rise per stage).

This rate of progressive cool water injection to nominally provide saturation reduces the exit gas temperature from about 727.9 K (455 deg C., 850 deg F.) for dry compression to about 428.4 K (155.3 deg C., 327.1 deg F.) relative to 288.2 K (15 deg C., 59 deg F.) compressor inlet temperature at 20 atm. i.e., the ratio of outlet temperature to inlet temperature drops from about a 252.5% increase in absolute temperature with dry compression to 148.7% increase with progressive wet compression. Such progressive wet compression reduces the outlet absolute temperature by about 41.1% to 58.87% of the increase in outlet absolute temperature for dry compression.

This cooling of the compression work and reduction in absolute temperature rise gives a corresponding reduction in relative power per unit mass flow (specific power) of about 27.1%. e.g., reducing the work of compression by 8.2 MW from 38.4 MW (100%) for dry compression down to about 30.2 MW (72.9%) for saturating progressive wet compression in this example.

A large compressor may use 65% of gross expander power to compress the flow leaving only 35% for net power. This reduction in wet compression work is about 17% of gross expander power or about 50% of net power in this example. i.e., Progressive Wet Compression in a power system may increase the net expander output by about 50%. This reduces specific capital costs of the power system comprising the wet compressor.

A typical compressor efficiency of 90% indicates compressor losses of 10%. Compressor work savings of 27% are about 270% of the compressor losses. Such cycle efficiency improvements may provide life cycle system savings similar to or greater than the cost of the compressor. It appears much easier to improve compressor efficiency with wet compression than by further increasing the mechanical efficiency of the compressor.

Cool Overspray: With further reference to Table 2, in a similar configuration, sufficient liquid diluent (e.g., water) is preferably added progressively to form and maintain a progressive overspray of about 2% of the total flow. Orifices are preferably configured to improve overspray distribution towards providing overspray throughout the fluid being compressed within the compressor. Such progressive overspray beneficially assists towards continuously saturating and cooling the flow being compressed. It further beneficially provides direct contact sensible cooling between the liquid diluent and the fluid being compressed.

For example, in some configurations, orifices may be configured in direct contactors or preferably in one or more airfoils to give oversprays near the inlet to multiple compressor stages, and preferably for each compressor stage. Preferably, progressive overspray is provided for at least three stator airfoils, and more preferably for the corresponding rotor airfoils as well.

With reference to Table 2, in one configuration numerous fine orifices forming very fine droplets are provided. The gaseous flow being compressed is nominally modeled as being continuously saturated about and along the compressor. In practice, a desired degree of saturation is preferably specified at each stage. E.g., an 80%, 90%, 95% or 98% degree of saturation.

Adding cooling liquid spray to maintain a 2% mist overspray in each stage further drops the humid compressed air temperature exiting the compressor outlet 24 deg C. compared to just saturating the flow. i.e., a drop fiom about 455 deg C. (850.2 deg F.) for dry compression to about 131 deg C. (268.5 deg F.) for wet compression. This 2% mist progressive overspray achieves a 5.6% increase in the cooling achieved. E.g., reducing the absolute temperature increase by dry compression from 58.88% for saturating cooling to 55.57% for overspray. The progressive overspray provided may be greater than 0% (saturation), preferably 1%, and more preferably at least 2% by mass of the fluid being compressed. This may provide an additional 2% sensible cooling, preferably 4% sensible cooling and at least 8% sensible cooling compared to the evaporative cooling to saturation.

Warm Saturating Spray and Heat Recovery: The cooling liquid may also be used to recover heat from elsewhere for some embodiments. E.g., from other parts of the compression system, from a downstream combustion or chemical reaction system, and/or from a power system. This may include cooling heated components such as compressor airfoils or duct, combustor walls or components, the duct or transition zone to a turbine, or turbine stationary or rotating airfoils, duct or hub etc. Such heated cooling liquid may be beneficially used to cool hotter compressed gaseous fluid in the downstream portion of the compressor.

Where both heated and cooler liquids are used, it is generally preferable for greater direct contact sensible cooling to use the cooler liquid upstream and the hotter liquid downstream. However, under some conditions it is more difficult to form small droplets and rapidly evaporate sufficient cooler liquid to achieve the desired degree of evaporative cooling, especially in upstream portions of the compressor.

The kinetics of drop formation, breakup, sensible heat transfer, and evaporation are preferably incorporated to evaluate the desired delivery rate, temperature and method of cooling liquid into the gaseous fluid together with thermodynamic factors. Accordingly, a portion of hotter cooling liquid is preferably delivered upstream to more rapidly form drops and to provide more rapid evaporation in some configurations.

Hot Water Saturating Progressive Wet Compression: With further reference to Table 2, one configuration comprises increasing the progressive compression water delivery temperature from about 15 deg C. (59 deg F.) to hot water at about 65.6 deg C. (150 deg F.). Such higher temperature cooling liquid assists in shattering larger drops into fine droplets by flash evaporation, which aids evaporation. This configuration preferably recovers heat from downstream turbine exhaust etc. to heat the cooling water to this higher temperature. This is further taught in the VAST.003 Thermodynamic Cycle technology incorporated by reference.

Progressively or continuously saturating water spray forms a mass ratio of water to air flow at the compressor exit of about 8.81% with 65.6 deg C. (150 deg F.) air for a cumulative compression ratio BETA of 20. A full dynamic flow, spray breakup, and evaporation model is expected to show greater benefit for such flash evaporation relative to cool liquid diluent delivery.

This higher temperature only degrades the direct benefit of temperature reduction by wet compression by about a 0.4 percentage point (excluding heat recovery). i.e., from an absolute temperature of about 727.9 K (454.8 deg C.) for dry compression to 431.4 K (158.3 deg C.) for progressive wet compression using 65.6 deg C. (150 deg F.) water. This gives a reduction in outlet/inlet absolute temperature ratio of 252.5% to 149.7%, or a relative change in absolute temperature from 100% to 59.29%. Using such higher temperature cooling water degrades the compression work benefit of wet compression by 0.4 percentage points to 73.3% of dry compression, while recovering further heat from the exhaust. Higher temperature water may similarly be used.

Progressive Overspray with Cool Water: With further reference to Table 2, another configuration comprises progressive wet compression using a progressive overspray of cool cooling water. e.g., about 2% using cooling water at about 15 deg C. (59 deg F.). This increases cumulative water delivery to about 10.28% at the outlet at a BETA of about 20. In this configuration, the increase in compressor outlet temperature for dry compression is reduced by about 44.71% to 55.29% of dry compression absolute temperature increase. e.g., from 727.9 K to 404.4 K.

This configuration further reduces the specific compression work relative to nominally saturating progressive wet compression by about an additional 0.43 percentage point. E.g., from about 72.86% of the dry compression work to about 72.43% of the dry compression work (with 15 deg C. water at a cumulative compression ratio BETA of 20).

Progressive Overspray with Hot Water: With further reference to Table 2, another configuration comprises progressive wet compression using progressive overspray with hot cooling water. E.g., delivering about 2% progressive overspray using hot cooling water at 65.6 deg C. (150 deg F.). This increases the cumulative water delivery to about 11.02% at the outlet at a cumulative pressure ratio BETA of about 20. In this configuration, the increase in compressor outlet temperature for dry compression is reduced by 44.1% to 55.9%. e.g., from 727.7 K to 406.8 K.

This configuration reduces the work of compression per mass flow by 0.53 percentage points relative to nominally saturating progressive wet compression. E.g., from about 73.29% of the dry compression work for saturating progressive wet compression to about 72.76% of the dry compression work for progressive wet compression with 2% overspray with 65.6 deg C. (150 deg F.) water at a cumulative compression ratio BETA of 20.

Further Configurations: Applying the methods described herein, in one configuration, the mass ratio of coolant fluid to gaseous fluid exiting the compressor divided by the cumulative pressure ratio beta is greater than 0.0015. e.g. 0.03/20. In another configuration, the mass ratio of coolant fluid to gaseous fluid exiting the compressor divided by the pressure ratio is greater than 0.0025. e.g., 0.05/20. In another configuration, the ratio of average Celsius temperature increase to the cumulative pressure ratio BETA of the compressed gaseous fluid exiting the system is at least 5 degrees Celsius lower than the ratio of temperature increase to BETA that would have been attained after adiabatic dry compression to the same BETA. E.g., 100 deg Celsius/20.

In another configuration, the ratio of average Celsius temperature increase to the pressure ratio of the fluid exiting the system is at least 100 degrees Celsius lower than the ratio of temperature increase to natural log of BETA ("LN BETA") for equivalent adiabatic dry compression to the same BETA. E.g., 300 degrees Celsius/(LN(20).

Adjusting for Ambient Conditions: Under some ambient conditions fogging or spraying water upstream of the compressor could result in ice formation with reduced air flow and potential damage to the compressor. In such configurations, the liquid diluent or water delivery locations are adjusted to avoid delivery into upstream locations where such formation of freezing diluent (and/or icing) could occur. Water may still be delivered further downstream where compression heating of the air raises the temperature above where icing could occur. In other configurations, hotter water is preferably used to cool air in more upstream locations to provide evaporative cooling while avoiding icing that might be caused by cooler water.

Surface cooling: In some configurations, cooling of stationary and/or rotating compressor airfoils or of the compressor duct may be added. This beneficially cools the airfoil and reduces airfoil expansion. It further helps increase the rate of cooling of the gaseous fluid flowing past the compressor airfoil and/or duct. E.g., water may be used to cool one or more of these components. The heated liquid may further be delivered into the gaseous fluid at one or more locations within the compression system, or may be delivered into the downstream compressed fluid.

Specific Volume and Flow Area: Table 3 shows the cumulative pressure ratio BETA, mass specific volume and molar specific volume of the configurations described herein for FIG. 14 and Tables 1 and 2. The cumulative pressure ratio "Cum BETA" is shown increasing multiplicatively with stage pressure ratios, from one to twenty, over ten uniform compression ratio stages. Table 3 details the mass specific volume (m^3/kg) and molar specific volume (m^3/kmol) corresponding to the configurations of Table 2.

TABLE 3

Specific Volume for Dry versus Progressive Wet Compression

| Stage Out | Cum BETA | Ln (Cum BETA) | Dry | | 15° C. Saturated | | Progressive Wet Compression Water Temperature 65.6° C. Saturated | | 15° C. Saturated, overspray 2% Over | | 65.6° C. 2% Over | |
|---|---|---|---|---|---|---|---|---|---|---|---|---|
| | | | m^3/kg | m^3/kmol | m^3/kg | m^3/kmol | m^3/kg | m^3/kmol | m^3/kg | m^3/kmol | m^3/kg | m^3/kmol |
| 0 | 1.00 | 0.000 | 0.818 | 23.59 | 0.818 | 23.59 | 0.818 | 23.59 | 0.818 | 23.59 | 0.818 | 23.59 |
| 1 | 1.35 | 0.300 | 0.666 | 19.22 | 0.657 | 18.94 | 0.658 | 18.95 | 0.635 | 18.10 | 0.637 | 18.13 |
| 2 | 1.82 | 0.599 | 0.543 | 15.66 | 0.512 | 14.70 | 0.513 | 14.73 | 0.492 | 13.96 | 0.493 | 14.00 |
| 3 | 2.46 | 0.900 | 0.442 | 12.76 | 0.397 | 11.34 | 0.398 | 11.37 | 0.379 | 10.73 | 0.381 | 10.76 |
| 4 | 3.31 | 1.197 | 0.360 | 10.39 | 0.306 | 8.721 | 0.308 | 8.750 | 0.292 | 8.225 | 0.294 | 8.256 |
| 5 | 4.47 | 1.497 | 0.293 | 8.458 | 0.236 | 6.689 | 0.237 | 6.714 | 0.225 | 6.300 | 0.226 | 6.327 |
| 6 | 6.03 | 1.797 | 0.238 | 6.879 | 0.182 | 5.124 | 0.183 | 5.144 | 0.173 | 4.824 | 0.174 | 4.846 |
| 7 | 8.14 | 2.097 | 0.194 | 5.591 | 0.140 | 3.921 | 0.141 | 3.941 | 0.133 | 3.693 | 0.134 | 3.711 |
| 8 | 10.99 | 2.397 | 0.157 | 4.540 | 0.108 | 3.000 | 0.108 | 3.014 | 0.102 | 2.826 | 0.103 | 2.841 |
| 9 | 14.82 | 2.696 | 0.128 | 3.682 | 0.083 | 2.298 | 0.083 | 2.311 | 0.078 | 2.165 | 0.079 | 2.177 |
| 10 | 20.00 | 2.996 | 0.103 | 2.978 | 0.064 | 1.753 | 0.064 | 1.766 | 0.061 | 1.655 | 0.061 | 1.665 |

The specific volume of "Dry" compression of 60% relative humidity air is shown at the compressor inlet. The subsequent stages show the mass specific volume at the end of each stage. The "Wet Compression" depicts the results of nominally progressive "Saturation," and of 2% overspray, "2% Over," of water to air by mass. The "2% Over" assumes that percent by mass of overspray is entrained and in full direct contact heat exchange with the fluid being compressed. These preliminary models assume all saturating water is injected and evaporated at the beginning of each stage, while the results are shown in the specific volume at the end of that stage.

Figure 15:
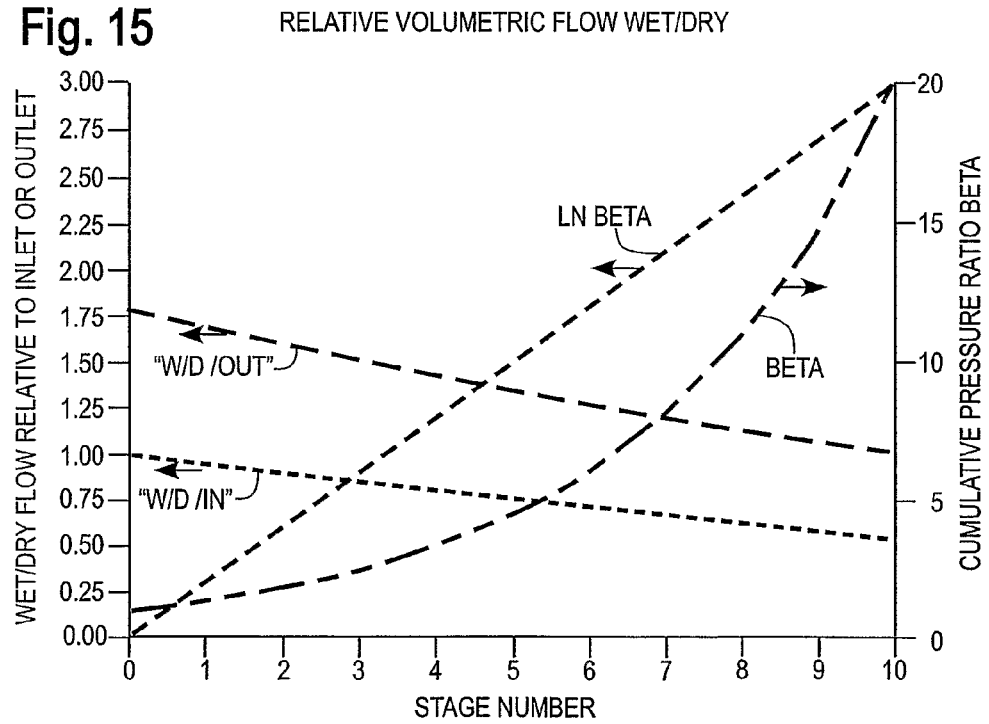
FIG. 15 A diagram of relative wet to dry volumetric flow and pressure ratio with compressor stage number.

The relative results of the fourth case of hot wet compression are depicted in FIG. 15 versus compressor stage number. The cumulative pressure ratio "BETA" is shown increasing geometrically with stage number. The natural logarithm of the pressure ratio "LN BETA" is shown increasing linearly with stage number. i.e., equal pressure ratio stages in this example.

In Table 3, for the first wet compression configuration, saturating cold progressive wet compression (about 15° C. water) reduces the molar specific volume exiting the compressor by about 41.1% from dry compression. (i.e., from 2.978 m^3/kmol for dry air to 1.753 m^3/kmol.) The fourth configuration of hot overspray wet compression (e.g., "65.6° C. 2% Over") further reduces the molar specific volume by about 44.1% relative to dry compression.

The relative molar specific volume in this fourth wet compression configuration is preferably ratioed to the dry compression molar specific volume ("W/D"). This is then preferably normalized to "W/D" at the compressor inlet to give the normalized relative specific volume "W/D/IN" graphed in FIG. 15. This "W/D/IN" line shows how hot overspray progressive wet compression very strongly reduces normalized relative specific molar volume of the flow being compressed by about 44.1%. E.g., from 1.0 at the compressor inlet, to about 0.559 at the compressor outlet.

Similarly, normalizing the relative wet to dry molar specific volume "W/D" data to the outlet relative molar specific volume gives the line "W/D/OUT" in FIG. 15. This shows wet compression gives a very substantial higher specific volume inlet capacity of about 78.9% for the same compressor outlet specific molar volume, assuming the same flow velocities throughout the compressor. i.e., "W/D/OUT" declines from about 1.789 to 1.0 along stages 0 to 10.

Compressor Design Flow Area Axial Distribution: To desirably use similar velocities through the compressor, the design cross sectional flow area distribution with axial distance for the wet compressor is preferably reduced in proportion to this "W/D/IN" line when the same inlet area is desired. E.g., for the same air flow in the intake, the progressive wet compressor flow path is preferably progressively REDUCED from 100% at the inlet to about 55.9% of the equivalent dry compression flow area at the compressor outlet at BETA=20. i.e., a progressive REDUCTION to about 44.1% in cross sectional area for about an 8.09% INCREASE in mass flow due to water injection.

Thus, the wet compression operational problems typically observed from progressively ADDING water in a compressor designed for dry compression are solved by progressively REDUCING the compressor's cross sectional area flow path with axial distance compared to the dry compressor. (e.g., solving stalling) This solution initially appears counter intuitive.

Similarly, when the wet compressor is desired with the same outlet molar specific volume flow as a dry compressor, the design cross sectional flow area axial distribution is adjusted relative to the outlet area in proportion to the "W/D/OUT" line. The 44.1% relative reduction above is here used to INCREASE the wet compressor inlet flow area to 178.9% at the inlet to 100% at the outlet relative to the equivalent dry compressor. The same pressure is achieved at a substantially lower temperature. Again, this method of INCREASING the compressor inlet relative to the outlet to solve operational problems of ADDING water is initially counter intuitive.

With these operational benefits of wet compression, the operational compression ratio per stage is preferably increased by about 20% or more, and more preferably by about 40% or more compared to an equivalent "dry" compression system without cooling liquid diluent. This beneficially reduces the number of stages and compressor cost.

Compressor Axial Configuration for Cooling Compression: With respect to FIG. 15, the desired relative molar specific volumetric flow "Wet/Dry/IN" wet compressor configuration varies highly non-linearly with cumulative compression ratio BETA. The compressor configuration parameter "Wet/Dry/IN" preferably declines generally in proportion to the increase in natural logarithm of cumulative pressure ratio BETA "LN BETA."

Figure 16:
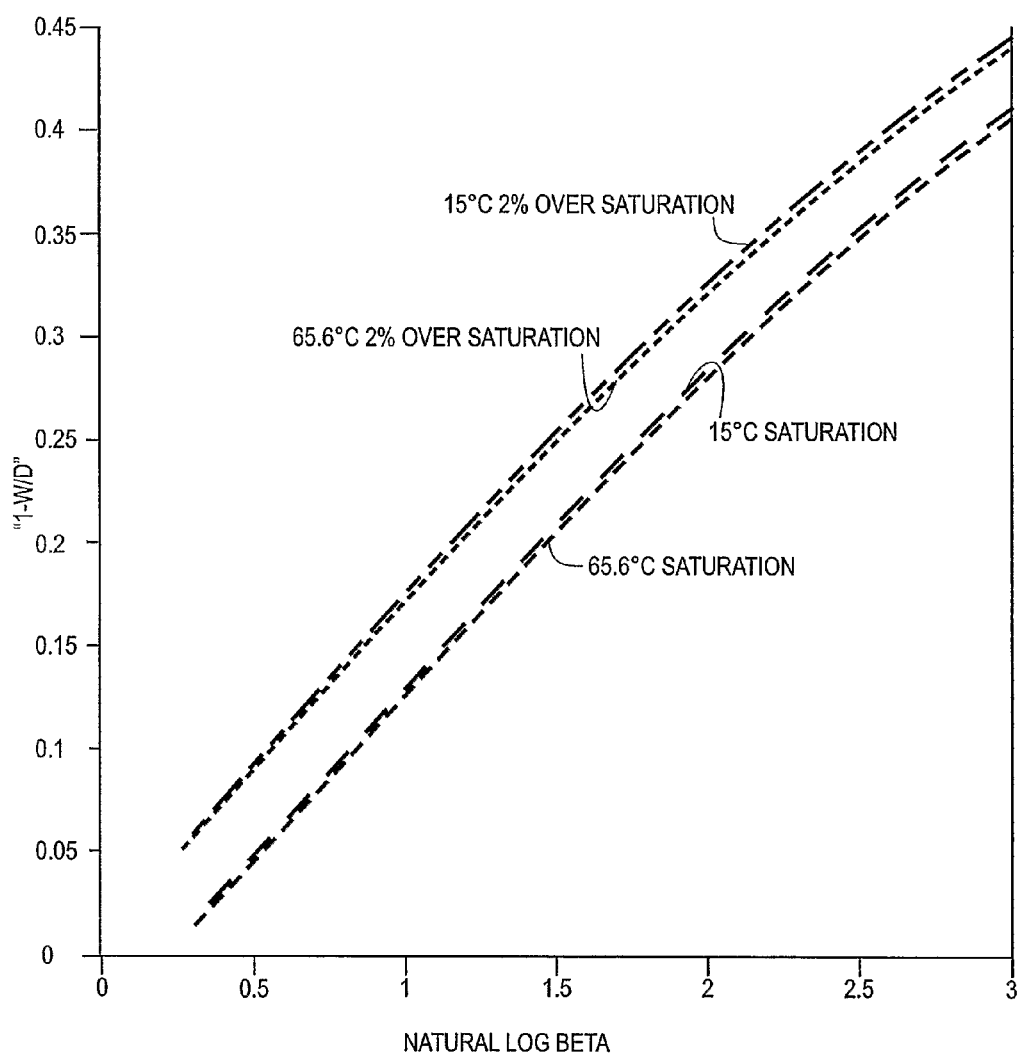
FIG. 16 Configuration graph of water delivery and compressor axial flow area vs natural logarithm of cumulative pressure ratio BETA.
Figure 17:
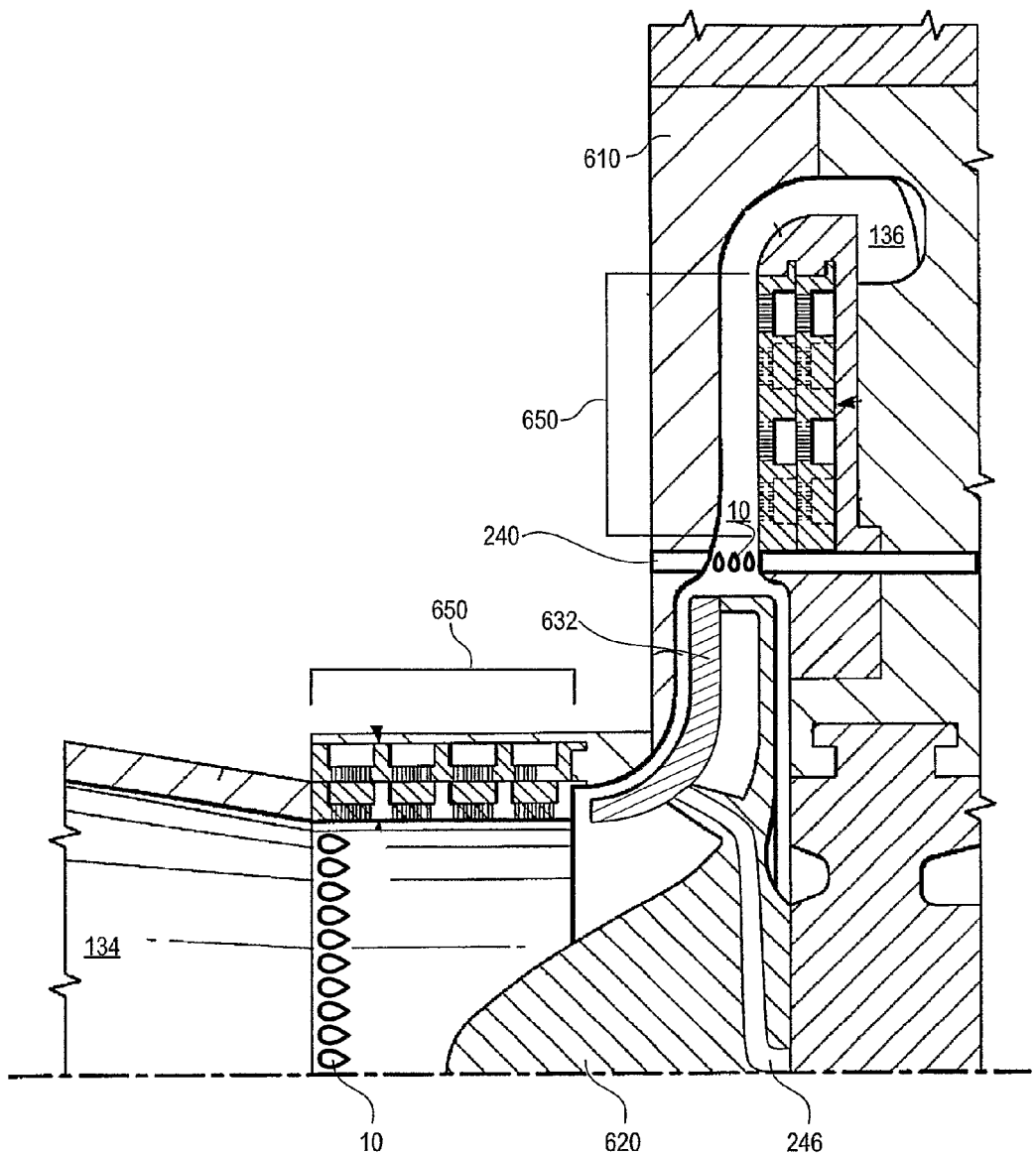
FIG. 17 A schematic centrifugal compressor with cooling liquid delivery and modified rotor.

This desired configuration method is more clearly seen in FIG. 16 for the configurations shown in Table 2. The two saturating flows are grouped about the lower line and the overspray flows about the upper line. The temperature of the cooling liquid makes a small difference. E.g., the hotter 65.6° C. water delivery curves are slightly below the cooler 15° C. water delivery curves.

The proportional change in relative molar specific volumetric flow "W/D/IN" is obtained as by subtracting it from inlet conditions and labeled as "1−W/D". The axial distributions of water delivery and compressor axial flow area are preferably jointly configured by the primary correlation with cumulative pressure ratio BETA as shown in FIG. 16. E.g. the proportionality of the relative normalized flow change "1−W/D" versus the natural log of cumulative pressure ratio BETA "LN BETA."

In some configurations the relative decrease in normalized Wet to Dry temperature ratio ("1−W/D") to natural log of pressure ratio (LN BETA) is at least 0.01. e.g., a reduction of 0.03/LN(20.)

The relative water delivery and compressor axial flow area are preferably adjusted for the desired overspray, as shown by the upward vertical offset of the "1−W/D" versus "LN BETA" curve with increasing overspray. i.e., by subtracting the delivery of unevaporated cooling liquid Overspray "Os" from the saturating cooling liquid delivered W. e.g., subtracting the relative overspray parameter "Os/D" from relative molar specific saturating flow "W/D", or by adding "Os/D" to the change in relative molar specific flow "1−W/D." The further small effects of relative humidity in inlet air may be adjusted for, especially between the compressor inlet and first stage outlet.

Configuring the relative water delivery and compressor axial flow preferably adjusts for the curvature of the "1−W/D" curve with increasing cumulative pressure ratio BETA. E.g., accounting for the increasing deviation of real gas parameters from ideality with increasing pressure.

The effective degree of saturation achieved in real wet compression may be accounted for by taking the cooling liquid or water evaporation rate as with a saturation parameter S times the evaporatively saturating flow W. e.g., where S may vary from 0.5 to 0.99 according to the effectiveness of wet compression.

This method of configuring wet compression provides for scaling with pressure ratio and degree of effective diluent saturation of the fluid being compressed. The gaseous molar mass is accounted for by the molar specific volume. The ratios of latent heat of evaporation of the cooling liquid to the heat capacity of the fluid being compressed are preferably incorporated to farther extrapolate from water and air to other cooling fluids and gases.

Table 4 shows the parameters obtained by fitting this desired normalized relative water delivery "1−W/D" to a cubic third degree polynomial in the natural log of the pressure ratio BETA "LN BETA," for the four cases shown in Table 2. i.e., $Y = A0 + A1*X + A2*X^2 + A3*X^3$ where $Y = $"1−W/D" and $X = $"LN BETA." As described above, A0 can be interpreted as the offset due to the relative overspray i.e. −Os/D. A1 is the direct proportionality between "1−W/D" and "LN BETA." A2 and A3 account for the non-linearity in the curve.

TABLE 4

| | | Polynomial Coefficients "1-W/D" versus "Natural Log of BETA" | | | |
|---|---|---|---|---|---|
| Coefficient | Variable X = LN (BETA) | 15° C. 59° F. Saturated | 65.6° C. 150° F. Saturated | 15° C. 59° F. 2% Over | 65.6° C. 150° F. 2% Over |
| A0 | 1 | −3.329E−2 | −3.264E−2 | 0.515E−2 | 0.380E−2 |
| A1 | X | 15.755E−2 | 15.273E−2 | 17.986E−2 | 17.747E−2 |
| A2 | $X^2$ | 0.833E−2 | 1.034E−2 | −0.654E−2 | −0.551E−2 |
| A3 | $X^3$ | −0.380E−2 | −0.412E−2 | −0.152E−2 | −0.168E−2 |

Compressor Axial Configuration for Non Linear Coolant Delivery: While modeled with equal pressure ratio compressor stages, similar benefits of fluid cooling are obtained when evaluated relative to the pressure ratio of each compression stage along the compression path for other compressor configurations. The axial distribution of stage pressure ratios is preferably configured to be non-linear, the axial distribution of gaseous temperature increases is non-linear, and the axial distribution of cooling liquid drop evaporative rates are generally nonlinear. Consequently, the axial distribution of delivery rates of liquid coolant to achieve axial distribution of desired degrees of saturation is preferably configured to be non-linear to provide an axial distribution of a desired degree of cooling sufficient to progressively provide a degree of saturation.

Compressor Axial Configuration for Linear Coolant Delivery: In some configurations, the axial distribution of compressor pressure ratios is preferably configured to provide an axial curvilinear distribution of pressure and temperature increases so as to give about a linear axial delivery distribution of cooling fluid need to achieve a prescribed degree of saturation per stage.

E.g., where the progressive cooling liquid delivered per stage from evaporation and sensible heat exchange is preferably within a range from about 90% to about 110% of the overall compressor mean cooling flow required per stage to saturate the flow being compressed. Progressive overspray may be added in addition to this to facilitate evaporation and saturation.

In such configurations, the upstream stages are preferably configured with higher pressure ratios than downstream stages. This beneficially provides for higher pressure increases, more work and higher temperature increases in upstream stages which are cooler and where rotor tolerances can more easily accommodate temperature changes, than in downstream higher pressure and higher temperature stages. E.g., in one embodiment, two downstream stages may have lower compression ratios than two or more upstream stages.

Outlet Composition control: In some embodiments, the cooling liquid delivery rate is prescribed in proportion to the rate of gaseous fluid delivered for compression to provide a prescribed composition in the compressed fluid delivered to the outlet of the compression system. The liquid delivery rate may be controlled based on the proportion of vaporized liquid, desired in the outlet flow. The liquid delivery rate is preferably configured to further provide a prescribed mass portion of droplets of cooling liquid relative to the compressed gaseous fluid desired at the outlet of the compressor.

E.g., providing a mass portion of droplets of between 0.1% and 5% of the mass flow of fluid being compressed. E.g., where the mean overspray is within ±0.5% or ±1% of a prescribe mass ratio to the air flow into the compressor. Preferably, the progressive overspray droplets are configured in finer overspray flow ranges such as from 0.5% to 1.5% for a nominal 1% overspray by mass, or from 1% to 3% for a 2% overspray by mass. In one embodiment, the cooling liquid delivery relative to compressor stage pressure ratio is reduced in two or more stages near the compressor outlet. This may be used to reduce or eliminate overspray in the compressor outlet.

Outlet Temperature Control: In some configurations, the cooling fluid delivery is prescribed as that needed to constrain the temperature of the compressed fluid to within a prescribed temperature range or to less than a prescribed maximum temperature on delivery from the compression system. Where multiple constraints are desired, the desired cooling liquid delivery rate is prescribed to be within a range, or as less than a maximum or more than a minimum rate according to the combined logic of desired constraints.

Transverse Distributions of Liquid Delivery: Compressors typically have high streamwise flow relative to transverse turbulence, resulting in poor transverse mixing. To better achieve mean desired liquid cooling rates, cooling liquid is desirably delivered through numerous small orifices to provide fine drops with a desired size and spatial distribution. The numerous orifices are preferably distributed about a plurality of airfoils. These are more preferably distributed about the airfoils, including one or more of transversely across an airfoil, axially streamwise along an airfoil, and/or on one or both convex and concave surfaces of an airfoil. E.g., see FIG. 1, FIG. 5.

The cooling liquid delivery is preferably spatially distributed to provide desired transverse distributions of evaporation and sensible cooling rates across the flow. The desired evaporation rates are preferably in proportion to the amount of unsaturation in the gas over the spatial evaporation range. The cooling fluid delivery rates are adjusted accordingly to account for dynamic droplet evaporation rates with trajectories.

In addition to mean flow prescriptions, transverse distributions of the cooling liquid delivery rate are preferably prescribed along with the axial and/or curvilinear streamwise fluid liquid delivery rate distribution in some embodiments. E.g., the desired transverse delivery rate distribution of the cooling liquid along a radial direction in an axial annular compressor. Corresponding transverse distributions may be configured for the respective curvilinear streamwise flow directions in radial or centrifugal compressors.

Figure 13:
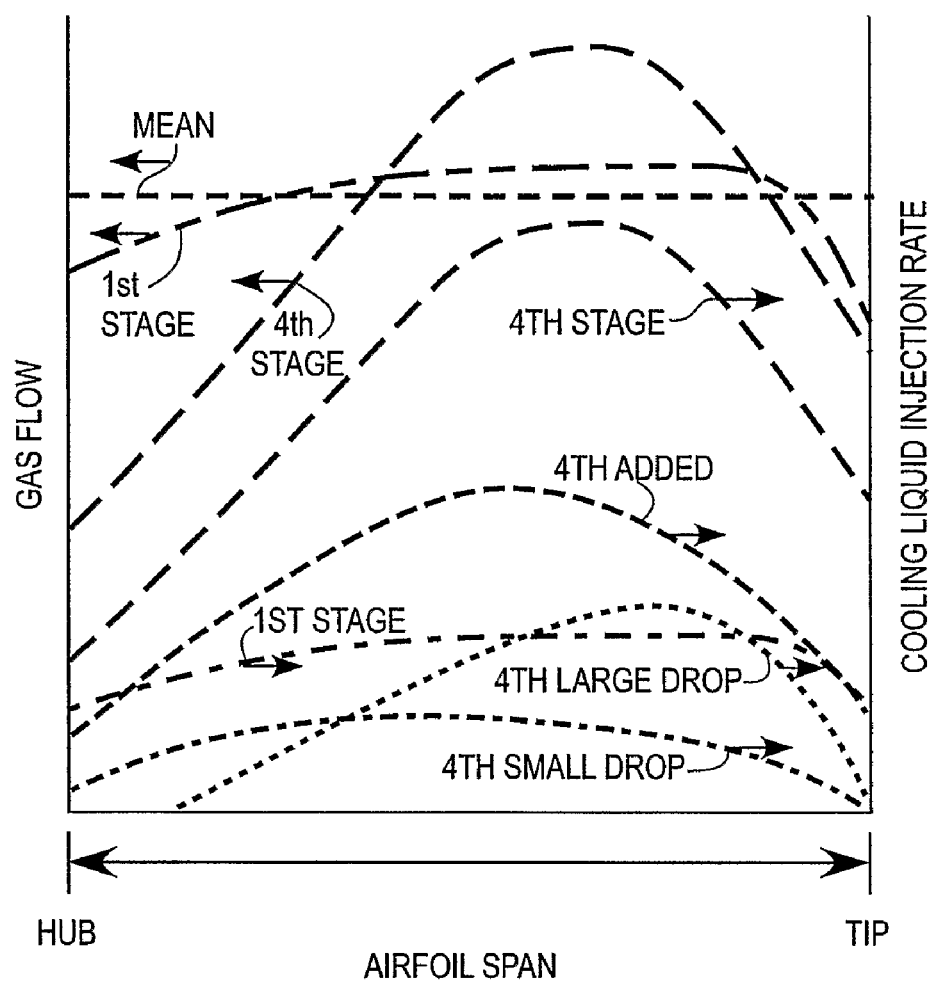
FIG. 13 A diagram of relative transverse gaseous flows and coolant liquid injection rates.

With reference to FIG. 13, a typical axial air velocity distribution within an axial compressor from hub to tip is schematically shown for a first compressor stage compared to the mean flow rate labeled "MEAN" and "$1^{ST}$ STAGE". A similar velocity distribution is schematically shown for a fourth compressor stage labeled "$4^{TH}$ STAGE". Such transverse distributions of streamwise velocity of the gaseous fluid within a compressor change strongly with streamwise location, compressor stage number and/or cumulative pressure ratio BETA. Similar flow variations are observed in radial and centrifugal compressors relative to a curvilinear streamwise flow path.

More generally, such distributions are taken from a centripetally (radially or "centrifugally") inward wall (or inlet axis) to a radially outward wall (or outlet radius) within the compressor stage, including axial, centrifugal, and radial compressors. The pressure, and thus the fluid density, may increase from a centripetally inward wall to a centripetally outward wall. Accordingly, the velocity distributions are preferably weighted by the fluid density to give mass weighted velocity distributions. Herein, where thermal cooling is desired, cooling flows are preferably compared to gaseous fluid flows on a mass basis. Cooling liquid delivery distributions are preferably prescribed on a mass basis for thermal cooling, (or by molar specific volume for configuring compressor flow areas. See below).

Some configurations will more preferably prescribe the mass weighted transverse distribution of desired cooling liquid delivery rates at multiple streamwise locations or continuously along the axial or curvilinear streamwise flow direction. As above, these may be described in terms of the respective transverse distributions of the desired degree of saturation of cooling liquid in the gaseous fluid. Such delivery distributions are generally increasingly transversely nonlinear with increasing streamwise compression stage number.

For example, with further reference to FIG. 13, the average gas flow is schematically shown as MEAN. The gas flow spatial transverse distribution is schematically shown as $1^{ST}$ STAGE relative to the left Y axis, varying from hub to tip of an airfoil. A typical transverse cooling liquid delivery rate is shown schematically for the first turbine stage as $1^{ST}$ STAGE relative to the right Y axis. The consequent downstream compressor gas flow distribution at the $4^{th}$ compressor stage is schematically shown as $4^{th}$ STAGE to the left Y axis. (Gas versus liquid flows are not shown to scale.) The peak to mean ratio increases with stage number as shown in FIG. 13. The axial location of the peak increases from about midway along the airfoil span towards the outer wall or tip as shown in FIG. 13.

Liquid diluent delivered is preferably delivered through orifices in a stationary airfoil in proportion to the transverse distribution of gaseous fluid mass flow, for upstream stages. E.g., as shown schematically by the "$1^{ST}$ STAGE" gas flow and cooling liquid injection rate curves in FIG. 13.

Fine liquid drops are moderately well entrained with the gaseous flow. However larger liquid drops have higher inertia to drag ratios. They are less well entrained with the flow and are more likely to impact airfoils or compressor walls. A rotating airfoil will impart centripetal acceleration to the surrounding gas and thus to entrained liquid drops. Cooling liquid delivered through orifices in a rotating airfoil will have a stronger centripetal acceleration increasing radially from hub to tip. The rotary motion of rotating airfoils in turbomachinery may cause differential centripetal motion among drops. Larger cooling liquid drops will move radially outward faster than smaller drops with increasing axial distance due to such centripetal acceleration.

Such differential centripetal motion is preferably accounted for to adjust the desired cooling liquid delivery rate distributions radially inward relative to the desired liquid cooling rate distributions in the transverse directions. More preferably, upstream cooling liquid delivery rate distributions are adjusted centripetally inwardly to adjust for centripetal motion when configuring for downstream desired transverse evaporation distributions.

A portion of the smaller cooling drops evaporate, leaving a residual portion of smaller drops from the first and subsequent stages. E.g., the spatial distribution of such smaller drops entering the $4^{th}$ stage is schematically shown in FIG. 13 as $4^{th}$ SMALL DROP to the right Y axis. Larger drops delivered through stationary airfoils or direct contactors will initially have a similar transverse distribution. However, the spatial distribution of centripetally accelerated residual larger drops entering the $4^{th}$ stage, $4^{th}$ LARGE DROP to the right Y axis, is schematically shown as centripetally displaced outwardly towards the airfoil tip. i.e., the transverse peak of $4^{TH}$ LARGE DROP is shown as displaced from the HUB towards the TIP, compared to $4^{TH}$ SMALL DROP.

Initial design may be performed with two dimensional configuration methods expanding on the methods described in the VAST.001 Direct Contactor technology incorporated by reference. The methods of VAST.002 Trifluid Reactor technology, incorporated by reference, are preferably used, including respective orifice and spray distributions. The centripetal acceleration of rotor airfoils pressurizing cooling fluid within an airfoil or rotating perforated direct contactor is preferably incorporated when modeling the differential pressure of the cooling fluid delivered through rotor orifices. E.g., when configuring one or more of the transverse distributions of rotor orifice size, orifice spatial density, and orifice orientation. It may similarly be used in configuring the cooling fluid passage size and transverse differential pressure distribution across the orifices.

More detailed modeling methods are preferably used to configure the cooling fluid flows. E.g., using multi-physics Computational Fluid Design (CFD) methods that more accurately model the complex flows, liquid jet breakup, drop breakup, drop impact, intra drop conduction, drop evaporation, flash evaporation drop shattering, sensible heating and/or cooling, radiation, and/or chemical reaction kinetics as significant.

This method may be applied to perforated contactors positioned across the stream upstream of a first compressor, between compressors, downstream of a compressor, and for a plurality of cooling liquid distributors at streamwise locations. This method is preferably applied at each compressor stage. More preferably, the method is applied for each airfoil and then at multiple axial locations along an airfoil, to configure orifices about stationary airfoils, and about rotating airfoils.

For example, with further reference to FIG. 13, a desired total spatial mass distribution of cooling liquid droplets at the $4^{th}$ stage is schematically shown, as $4^{TH}$ STAGE, to provide a desired downstream transverse cooling rate distribution. A complementary distribution of additional cooling liquid to be delivered is then prescribed as proportional to the difference between the desired delivery distribution, ($4^{th}$ STAGE to the right Y axis,) and the transverse distribution of entrained cooling liquid at that stage.

More particularly, the proportionality factor preferably accounts for the differences in evaporation due to temperature between the delivered liquid and the entrained liquid. This weighting is preferably further weighted according to the corresponding transverse distribution of liquid evaporation rate due to the transverse drop distributions of entrained cooling liquid at that compression stage. More preferably the weighting further accounts for the differences in subsequent axial and centripetal motion in evaluating the transverse distribution of liquid evaporation rate.

For example, with further reference to FIG. 13, this preferably accounts for the weighted sum of the smaller and larger drop distributions entering the $4^{th}$ stage, ($4^{th}$ SMALL DROP plus $4^{th}$ LARGE DROP.) This desired complementary liquid delivery spatial distribution is schematically shown as "$4^{TH}$ ADDED" to the right Y axis, for the $4^{th}$ compressor stage. This $4^{th}$ ADDED transverse distribution will depend strongly on whether the cooling liquid is delivered through one or more of a streamlined perforated contactor, a stationary airfoil, and/or a rotary airfoil in that compressor stage.

The spatial delivery of additional cooling liquid is preferably configured with a maximum within about 25% to 75% of the distance from the hub to the tip. More preferably, the added liquid delivery maximum is more preferably nearer the hub or centripetally inward wall than the maximum of the desired transverse distribution of cooling liquid at this stage to allow for rotor centripetal acceleration. E.g., the transverse maximum of $4^{TH}$ ADDED is preferably centripetally inward from the maximum of $4^{TH}$ STAGE according to the centripetal acceleration and transverse droop size distributions of the entrained cooling liquid. This transverse maximum in cooling liquid delivery is preferably centripetally inward (away from the tip) from the maximum of the $4^{TH}$ LARGE DROP distribution. It may further be centripetally inward from the maximum of the $4^{TH}$ SMALL DROP distribution for higher radial acceleration such as delivering a portion of the cooling liquid through rotor orifices.

Delivering cooling liquid to rotary airfoils: Suitable rotary seals are preferably provided about an rotary shaft to delivery cooling liquid to the rotary airfoils. For example, this preferably includes a chevron seal comprising multiple thin chevron channels in a sleeve bearing. Cooling liquid is provided to the outer portions of the chevron channels. One or more manifolds are preferably configured to draw pressurized fluid from near the center of the chevron seal.

Streamwise Weighted Delivery Distributions: Because of the rapid streamwise flow, cooling liquid drops commonly traverse a number of compressor stages before fully evaporating. E.g., For liquid with a Sauter Mean Diameter (SMD) drop size larger than 30 microns (micrometers), a portion has been reported to exit some compressors without completely vaporizing. (The Sauter Mean Diameter D32 is the diameter of a drop having the same volume/surface ratio as the entire spray. While SMD is a common size measurement, other size measures may be used.) Even small drops, such as those having a size or Sauter Mean Diameter (SMD) between 1-5 microns (micrometers), may be entrained across several stages in axial compressors before evaporating. Medium sized drops are typically entrained across more stages.

The desired cooling liquid delivery distributions are more preferably configured to accommodate relatively slow drop evaporation across multiple stages. To obtain a desired evaporation rate for a first stage, one or more of a cooling liquid delivery rate, multiple upstream delivery locations and the cooling liquid temperature are preferably configured to provide a suitably distributed overspray. At subsequent stages, the residual drops carried downstream are accounted for and additional liquid spray is added to achieve desired cooling liquid drop distributions and respective evaporation rates.

This configuration procedure is preferably repeated along the streamwise flow to obtain cooling liquid delivery transverse distributions including orifice size, orientation and spatial location distributions and spatial distributions of liquid differential pressure distributions across the orifices. The subsequent droplet spatial distributions and then modeled and the desired transverse distributions for additional sprays are preferably configured. This method is preferably used to configure liquid delivery to obtain progressive drop spatial distributions. More preferably, it provides spatial overspray drop distributions that more effectively cool the gaseous fluid being compressed.

Outlet mist distributions: A mist of cooling liquid is desirably delivered along with the compressed gaseous fluid through the compressor outlet in some configurations. Cooling liquid delivery through downstream stages is preferably adjusted to leave such residual droplets in the compressed gas exiting the compressor. More preferably, the cooling liquid delivery spatial distributions through downstream stages are configured to provide desired spatial flow distributions of residual droplets exiting the compressor.

Configuring Surface Drop Impact: Large drops impacting surfaces at high relative velocity are known to erode materials. Conversely, small droplets will typically travel with major fluid flow and move around curvilinear surfaces. Orifice and nozzles generate poly-disperse sprays with a size distribution of drops. Airfoils and duct walls have a material strength that must typically be exceeded before drop impact is likely to damage a surface. Drops generally strike surfaces at some angle and then breakup into smaller drops. Kinetic impact energy can then be evaluated. E.g., by half the drop mass times the square of the normal component of relative velocity. The surface stress may then be evaluated, accounting for the three dimensional elasticity and strength components of the material surface.

Drop size and trajectories are preferably evaluated by computational fluid dynamic methods that accommodate drop size distribution, droplet evaporation rates in a compressing flow and drop surface impact. E.g., computer aided design (CAD) methods used to model internal combustion engines for liquid fuels have extensive drop size breakup and liquid impact sub-models. These are preferably configured or adapted to accommodate numerous orifices, multiple drop sizes, and sprays.

Orifices may be configured relative to turbomachinery components such that drop impact stress is configured to be less than a design surface stress. One or more of nozzle and/or orifice size, orientation, relative location, differential ejection pressure, and/or cooling liquid temperature, are preferably configured and/or controlled to constrain the rate of kinetic impact induced stress to be less than a prescribed surface design stress to reduce erosion of associated compressor components.

Drop size generation relative to compressing fluid flow and turbomachinery surfaces may be configured to constrain the upper size distribution of drops to be less than a prescribed portion. E.g., generally 90%, preferably 95%, more preferably 99%, and most preferably 99.7% of total cooling liquid delivered by mass has a mean diameter less than 20 microns.

The orifice configuration and fluid delivery parameters may be controlled to control the drop trajectory such that the relative normal impact velocity is less than a prescribed design surface stress level. Preferably the orifice and fluid delivery parameters are controlled to constrain the combination of drop size and impact velocity normal to turbomachinery impact surfaces such that the impact kinetic energy is controlled to less than a design surface stress.

Cooling liquid delivery and compressor construction are preferably configured and/or controlled to configured to control one or more of the portions of diluent with large drops, the location of droplet impact, the relative normal impact velocity, and/or the surface hardness about the droplet impact location, such that the portion of drops with kinetic impact normal to the surface relative greater than the material damage threshold is below a desired level to limit the rate of damage to a surface to be less than a desired damage rate.

E.g., cooling liquid delivery is configured so that preferably 95%, more preferably 99%, and most preferably 99.7% of liquid drops impacting a surface have a kinetic energy that causes a surface stress less than the design surface impact stress. Where the remaining droplet damage rate or erosion is relatively high, the surface is preferably hardened to constrain the droplet erosion rate.

Cooling Fluid Delivery Methods: To deliver cooling fluid with desired spatial distributions, numerous orifices are preferably distributed across the compressor duct. The VAST.001 technologies incorporated by reference describe numerous methods of delivering cooling liquid through perforated tubes comprising numerous orifices. With reference to FIG. 1, orifices may be positioned about a leading and/or trailing edge of a compressor airfoil as exemplified in FIG. 2 and 3. They may similarly be provided about an intermediate portion of an airfoil as exemplified in FIG. 4 through FIG. 7. While an axial airfoil is depicted, orifices may similarly be configured about the surfaces and/or walls of centrifugal and/or radial compressors.

With reference to FIG. 2, orifices 80 may be configured about an aerodynamically shaped wall 646 that is bonded to a leading edge 632 or trailing edge 660 of the compressor airfoil 630. e.g., in a V shape or preferably a more streamlined shape. This perforated attachment 646 forms a distributed fluid contactor by which to deliver cooling liquid into the surrounding fluid. This perforated attachment may comprise a manifold or distribution duct through which to deliver the cooling liquid to the orifices. Fiber laser welding methods have been demonstrated that can rapidly weld such thin materials with speeds of a meter per second or more. More preferably a perforated tube 10 may be formed into a triangular or streamlined shape to form a fluid duct 632 bonded to the leading edge or trailing edge of an airfoil as schematically depicted in FIG. 3 and FIG. 1

The outlet end of a fiber laser may be focused onto thin wall tubing to drill fine orifices with a size or mean diameter less than about 20 microns (micrometers). These orifices are preferably drilled smaller than about 10 microns, more preferably smaller than about 5 microns, and most preferably less than about 3 microns. To drill such fine orifices, lasers may be chosen with a capacity to drill holes with length to diameter ratios L/D of about 10, preferably about 30, more preferably of about 100, and most preferably of about 200 or higher.

e.g., Such lasers beneficially enable drilling orifices of about 1 to 5 microns in tubing or ducting with wall thicknesses ranging from about 0.1 mm to 2 mm. Forming orifices with mean diameters of about 3 microns beneficially enable forming high pressure microjets with similar or smaller drop sizes. The orifices may be elliptical or elongated channels, or other non-circular average orifice size. In such cases, the hydraulic diameter of an equivalent circular orifice is used as the average orifice diameter.

Orifices may further be desirably drilled at various angles, positions and spacings about such leading edges as described within the VAST.001 Direct Contactor and VAST.002 Trifluid Reactor technologies incorporated by reference, to achieve desired spatial distributions of microjets into the fluid surround the airfoil.

Cooling holes are commonly drilled in high temperature turbine blades. E.g., They may be 37 mm or more long with a length to diameter ratio of 70 giving a hole diameter of about 0.5 mm. With reference to FIG. 4, one or more thin embedded fluid ducts 672 are preferably drilled directly into thin airfoils such as compressor stators and/or blades. These fluid ducts may be drilled in from multiple directions as needed. Unneeded outlet holes can then be blocked by welding, brazing or other obstruction method. Much finer orifices 80 may then be drilled through the airfoil surfaces into such fluid ducts 672 or manifolds. The airfoil fluid passages 670 formed by these ducts 672 may then be connected to larger liquid distribution ducts or manifolds in the airfoil, the compressor duct or compressor.

With reference to FIG. 5, airfoils may further be formed in at least a thinner convex section 632 and a thinner concave section 634. A portion of a fluid channel 672 may then be formed in one of the portions 632 and/or 634 to form sections of a fluid channel 672 or similar fluid duct or manifold. e.g., by one or more of chemical etching, electrolytic drilling, mechanical drilling, or otherwise formed in one or both airfoil sections. A plurality of orifices 80 is then preferably formed between the outer surface and the fluid channel 672. e.g., Holes may be formed by fiber laser drilling, etching, EDM, or similar forming method. The two airfoil sections may then be bonded together with a bond 39. e.g., by using suitable brazing, welding, electron beam welding or other suitable bonding method. Such methods enable forming curvilinear fluid channels 672, ducts and/or manifolds about spatially curved airfoils with longer length/diameter ratios than are readily available with conventional drilling.

With further reference to FIG. 5, a variation on this fluid passage formation method is to configure the airfoil with the two portions bounding another plane (not shown). E.g., with a leading portion and a trailing portion. A portion of the fluid channel 672 may be formed in one or both airfoil portions. The leading portion and trailing airfoil portion are then bonded together with bonds 39. Orifices may then be formed though the thin edge of at least one of the leading or trailing airfoil portion into the fluid channel 672.

With reference to FIG. 6, airfoil orifices and manifolds may be manufactured by forming a suitably thin walled tube into a rectangular cross section. The airfoil may be cut into two sections with a thin fiber laser with an accuracy of a few micrometers. Alternatively, the airfoil may be formed into such sections. Fiber lasers or similar bonding methods may then be used to bond the perforated tube between the two sections of the compressor airfoil.

With reference to FIG. 7, a leading or trailing edge to a compressor airfoil may be formed by folding a thin wall into a curvilinear V shaped section or preferably an aerodynamically shaped airfoil edge. It may then be laser trimmed and welded onto a perforated tube which in turn is welded to a compressor airfoil section. Similarly, two curvilinear thin wall sections may be formed, trimmed and bonded together and onto the perforated tube to form such a leading or trailing airfoil edge 644.

The spatial distribution of orifices, orifice sizes, and orifice orientations are preferably configured using the methods described herein together with those of the incorporated technology to provide desired drop size distributions and drop spatial distributions. Multiple spatial distributions positioned along and transverse to the curvilinear streamwise flows are particularly configured to provide evaporation and sensible cooling rates in proportion to the progressive compression heating of the gaseous fluid.

Accommodating Cooled Compressor Flows: Evaporation of the water or vaporizable cooling fluid nominally results in an increase in molar flow and volumetric flow. However, the evaporative cooling provided strongly reduces the compressive heating and the corresponding increase in compressed gaseous fluid temperature. This in turn further reduces the volumetric flow rate of the compressed gaseous fluid and increases the mass flow.

This reduced volumetric flow, increased density, increased mass flow and increased compressor pressure change the relative velocities of flow versus compressor blade within the compressor. These parameters are preferably configured as curvilinear axial distributions and as rates of changes. E.g., of fluid flow rates, fluid compression rates, progressive coolant flows, evaporation and sensible cooling rates, rates of pressure increase, rates of temperature increase, etc.

In some embodiments, the back pressure on the compressor system nominally remains constant or the downstream components are configured for the compressor. In such configurations, the compressor is preferably reconfigured for these changes in temperature, density and volumetric flow.

With reference to FIG. 8, a compressor is schematically shown with six stages ST1 to ST6 with a downstream straightening stator S. These comprise six stationary airfoils S1 to S6 within a compressor duct 130. They further comprise six rotating airfoils R1 through R6 mounted on hubs or disks 628 about a compressor axis.

The cross sectional area of the compressor is schematically shown as being progressively reduced along the outer wall 132 of the duct with increasing compressor stage along a curvilinear streamline flow direction, from inlet 134 to outlet 136. This accommodates the reductions in fluid specific volume of the inlet flow 904 with increasing pressure and progressive cooling liquid evaporation or wet compression.

Such duct reconfiguration preferably accounts for the change in molar composition and mean molecular weight of the gaseous fluid with increasing coolant vapor fraction, and the corresponding change in specific heat at constant pressure cp. These in turn affect the heat capacity ratio gamma (cp/cv). The non-ideality of humid compressed gases is preferably accounted for with use of real gas properties and gas models that account for changes in the compressibility etc with composition, temperature and pressure.

The mean line flow analysis is then performed, accounting for the changes in fluid mass, composition, heat capacity, specific heat ratio, temperature, density, and molar specific volume along the compression flow path. Changes in enthalpy due to changing coolant fluid enthalpy with streamwise distance are also preferably accounted for. E.g., for changing temperature and/or pressure of the water or other coolant fluid. These methods may utilize texts such as Gas Turbine Performance by Walsh and Fletcher 2004, and/or commercial software such as Thermoflex from Thermoflow, Sudbury Mass. USA, or IPSEPro from SimTech Simulation Technology, Graz Austria.

With further reference to FIG. 8, another embodiment with existing compressors provides for retrofitting the compressor by adding flow constrictors 682 between the stators S1 to S6 and straightener S around the compressor duct wall to reduce the cross sectional area for gaseous flow. The flow constrictors 682 progressively reduce the cross sectional flow area of wet compression relative to the equivalent dry flow area, with increasing compression along the streamwise flow path. Such retrofitting may provide an interim solution to redesigning the entire compressor with associated new manufacture.

Configuring Cooled Wet Compression with Downstream Constriction: In some embodiments, there is a downstream constriction where the flow area remains constant. E.g., the constriction of a gas turbine inlet where the throat area between the inlet vanes is constant and often choked. In relevant art, the greater mass flow of cooled fluid through a downstream turbine or similar fluid flow constriction moves the turbine inlet closer to choked flow and increases the pressure upstream of that constriction. This increases the operating pressure of the turbine.

This pressure increase shifts the compressor substantially off design, reducing the compressor efficiency and reducing the safety margin to the compressor surge and choke limits. Such changes typically limit the amount of overspray to about 1.5% to 2% of the flow of air or gaseous fluid being compressed.

With the greater evaporative cooling and cooling overspray described herein, the compression process is preferably configured and/or controlled to accommodate the changes in streamwise molar specific volume streamwise along the compression flow path as well as through the downstream constriction.

Figure 9:
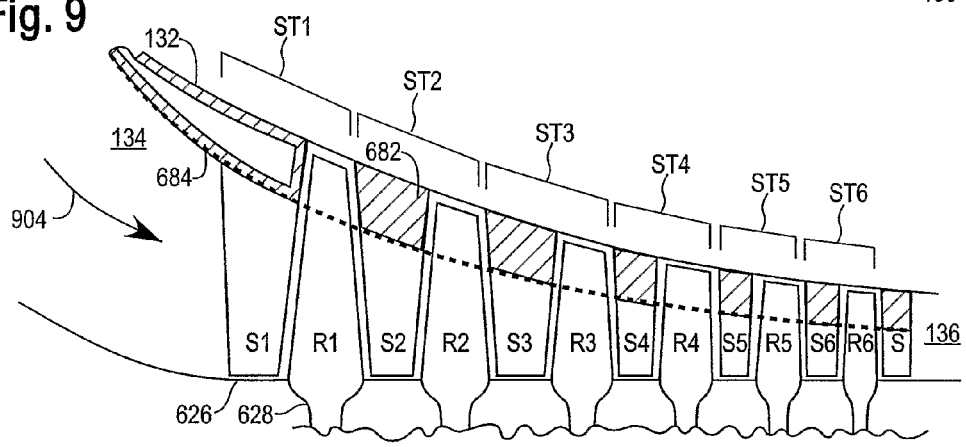
FIG. 9 An axial wet compressor with downstream diluent configured with outer flow constrictors.

With reference to FIG. 9, with new compressors, the compressor flow area is preferably further reduced over the embodiment shown in FIG. 8. As before, the axial distribution of compressor flow path cross section is progressively reduced relative to the dry flow configuration, with increasing distance along the streamwise flow (e.g., compressor stage number) or cumulative pressure ratio BETA.

Some configurations involve additional vaporizable liquid or diluent being delivered and evaporated downstream of the compressor and upstream of the downstream flow constriction. E.g., with wet or diluted combustion. This water or diluent displaces excess air or similar diluent gaseous fluid 904 that is being compressed. The cooling liquid delivered upstream of the flow constriction results in further reductions to the cross sectional area of the compressor stages ST1 to ST6 proportional to the reduction in flow of air or similar gaseous fluid 904.

With further reference to FIG. 9, existing compressors may be retrofitted by configuring flow constrictors 682 between stator airfoils S1 to S6 and straightener S, to progressively reduce the cross sectional flow area for the flow 904 within the compression stages, along the increasing streamwise flow direction from inlet 134 to outlet 136. These interleave rotor airfoils R1 to R6. Similarly, an outer inlet flow constrictor 684 may be positioned in the compressor inlet near the outer duct circumference 132.

Figure 10:
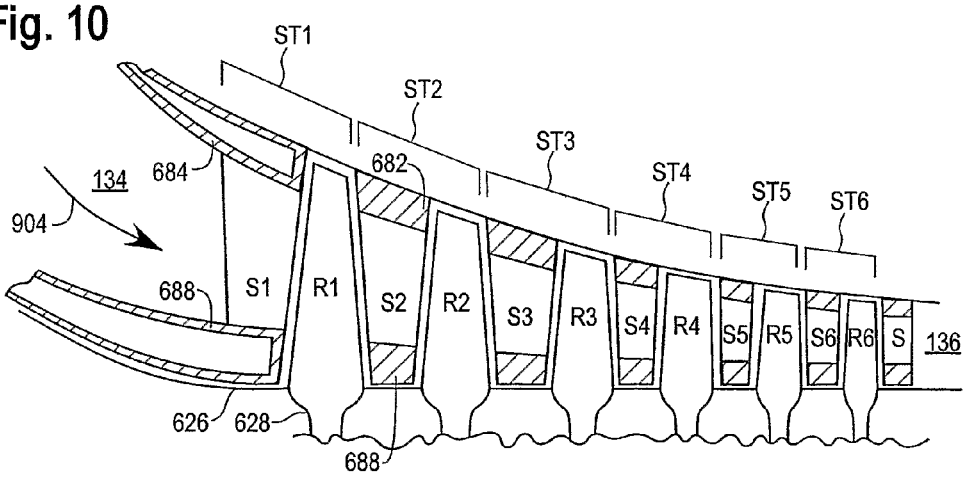
FIG. 10 An axial wet compressor configured with both inner and outer flow constrictors.

With reference to FIG. 10, in some embodiments both the inner and outer walls of the compressor duct are preferably reconfigured to accommodate the progressive wet compression taught herein. Equivalently, flow constrictors 682 and 686 may be positioned both about the outer wall 132 of the compressor duct and about the inner hub 626 of existing compressors. These are preferably positioned between stators S1 to S6, interleaving rotor airfoils R1 to R6.

An inner flow constrictor 688 may be provided in the intake duct about the rotor hub. An outer flow constrictor 684 may be provided in the intake duct about the outer duct wall. Similar flow constrictors may be positioned between rotor stages about the hub 628. e.g., positioned between stator airfoils within a stage. Providing both outer flow constrictors 682 and inner flow constrictors 688 helps reduce the high changes in flow direction near the blade hub, and the high velocity near the blade tip.

In some configurations, the blades may further be cut off at the tips and similar flow constrictors may be placed around the blade tips. This provides smoother flow from stage to stage along the outer circumference of the compressor duct.

With reference to FIG. 11, another embodiment preferably includes rotatable inlet stators or guide vanes, as schematically shown for adjusting the attack angle of upstream or inlet guidevanes (or movable stators) S1, S2 and S3 in stages ST1, ST2, and ST3. The compressor comprises interleaved rotor airfoils R1, R2 and R3 respectively in stages ST1, ST2, and ST3. The attack angle of these inlet guidevanes S1, S2 and S3 are preferably adjusted using adjustable stator controllers 692. This provides the progressive relative reduction in compressor flow area with increasing streamwise flow from inlet 134 to outlet 136 for the fluid 904 that is desired for wet compression relative to conventional dry compression.

Such control of guide vanes is preferably complemented by reducing the downstream compressor path. Equivalently, current compressor may be retrofitted using outer flow constrictors 682 and/or inner flow constrictors 686 to progressively reduce the cross sectional flow area in downstream compressor stages. The axial distribution of compressor cross sectional areas may be further adjusted by adding inner flow constrictors 686 and optionally an inner inlet flow constrictor 688 to reduce the flow near the compressor inlet 134.

With further reference to FIG. 11, in some configurations, the inner hub or disk duct wall may be reconfigured to progressively reduce the compressor area. Equivalently, further inner flow constrictors 686 may be provided between the stators about the inner hub as described for the embodiments in FIG. 10. Such flow constrictors may similarly be positioned between rotor blades about the hub. (Not shown.)

With reference to FIG. 12, some embodiments may comprise rotatable or adjustable inlet stators or guide vanes 690 for most or all of the compressor stages. E.g., as schematically shown for stages one through six ST1 through ST6 comprising Stators S1 to S6, rotor blades R1 to R6 and straightener S. As before, the attack angle of these adjustable inlet guide vanes are preferably progressively adjusted to progressively reduce the flow cross sectional area with increasing stage number and cumulative pressure ratio BETA in the streamwise flow direction as described herein. E.g., for the flow 904 from inlet 134 to outlet 136.

Some embodiments may include a downstream flow constriction and optionally further liquid delivery and evaporation downstream of the compressor and upstream of that flow constriction. With farther reference to FIG. 12, in some configurations, further flow constrictors 686 may be positioned about the hub between stators as is schematically shown for stators S1 through S6 and the straightening stator S at the outlet 136. A further constrictor 688 may be used around the rotor hub in the inlet duct 134. These may be used to accommodate such additional reduction in gaseous fluid as desired by the downstream liquid coolant or diluent evaporation.

Cooling Centrifugal Rotors: With reference to FIG. 16, some embodiments may use similar evaporative liquid cooling of gaseous flows being compressed by centrifugal compressors. In such embodiments, a streamlined perforated direct contactor 10 may be positioned across the compressor inlet 134 to a centrifugal compressor. This distributes vaporizable liquid coolant upstream of the centrifugal rotor 620. The liquid drops preferably provide an overspray which is entrained into the compression flow passage of the compressor rotor 620. Further orifices may be positioned along the duct wall 610 to deliver further cooling liquid into the flow.

Similarly a manifold 240 preferably ducts cooling liquid through the compressor wall 650. This provides cooling fluid to a streamlined direct contactor 10 which is preferably positioned across the diffuser duct downstream of the centrifugal rotor 620. This contactor distributes liquid drops across the hotter compressed flow to cool it within the diffuser. The cooled compressed fluid then exits the diffuser exit 136. This cooled compressed flow may similarly be ducted to subsequent compression rotors.

Cooling fluid may similarly be ducted through a manifold 246 into the centrifugal rotor 620. This preferably ducts cooling fluid to the rotor suction wall 632 where it is preferably delivered into the gaseous fluid being compressed through numerous orifices. The rotor wall 632 is preferably reconfigured to progressively reduce the duct cross sectional area in proportion to the reduced volumetric flow of cooled fluid relative to conventional volumetric fluid flow in dry gaseous compression.

Droplet Acoustic Damping: The method of delivering numerous cooling liquid drops within the gaseous fluid provides inertial viscous acoustic damping. This is due to the drag on drop motion by the relative motion between gaseous fluid and cooling liquid imparting viscous damping to the gaseous fluid. Configuring the compressor system for increasing delivery of cooling liquid relative to the prior art further increases the liquid damping of noise in the gaseous fluid. E.g., by increasing cumulative water spray from less than 2% to more than 4%, of the air flow by mass. The progressive cooling is preferably configured to deliver more than 6% of the air flow by mass, and more preferably 8% of the air flow by mass or more, for a cumulative pressure ratio BETA of 20. Such progressive wet compression is expected to provide a noise reduction of at least 2 dB in this configuration.

Overspray Reduction of Compressor Noise: The progressive overspray wet compression methods provided herein further reduce the acoustic noise generated within compressors by viscous inertial damping. In some configurations, the degree of overspray is preferably configured to increase or to adjust the degree of noise reduction desired. The degree of progressive overspray may be adjusted from about 0.1% to about 5% of gaseous fluid by mass for a BETA of 20. The progressive overspray is preferably adjusted to be within 1% to 3% of gaseous fluid by mass. The noise reduction obtained from such wet compression is expected to provide at least a further 1 dB noise reduction above saturating wet compression. i.e., progressive overspray is expected to provide a noise reduction of at least 3 dB in this configuration more than equivalent dry compression prior art to the same pressure ratio BETA and gaseous fluid flow.

Cooling Spray Delivery Rates: To provide the benefits of evaporative cooling and/or reducing compressor noise, the cooling liquid delivery system is preferably configured to deliver cooling liquid to approach saturation, to provide direct contact cooling, and/or to provide viscous damping.

In configuring the upstream portions of wet compression systems, a progressive overspray is preferably provided to assist in saturating the flow. Initially this preferably comprises about 250% to 500% of the theoretical evaporation rate per stage. E.g., 2% to 3% overspray for a 0.6%/stage W/A evaporation rate. In subsequent stages this may comprise about 125% to 250% of the theoretical evaporation rate per stage. E.g., 1% to 2% overspray relative to an evaporation rate of 0.7% W/A. Further downstream, this overspray may comprise about 100% to 150% of the evaporation rate. E.g., 1% to 1.5% overspray with 0.7% to 1%/stage W/A evaporation rate.

Where lower degrees of saturation are desired with progressive wet compression systems, the amount of cooling liquid delivered per stage may be at least about 40% and preferably at least about 67% of the theoretical amount that can be evaporated in that stage. More preferably, the coolant delivered per stage at least about 90% of the theoretical evaporation amount or more. E.g., in downstream stages where some residual overspray is entrained from upstream stages and/or little overspray is desired in the compressor. These ranges may be combined. E.g., from 40% to 500% of the theoretical evaporation rate per stage.

More preferably, the orifices configured about the airfoil are configured to configure the cooling fluid delivery rate along the curvilinear direction transverse to the streamwise flow. E.g., along a radial direction along the airfoil. Cooling fluid is preferably delivered in a mass flow ratio to the gaseous fluid. Transverse distributions of upper and lower bounds of mass flow ratio of cooling liquid to gaseous fluid are preferably prescribed along the curvilinear transverse direction. The cooling fluid is preferably delivered in a mass flow ratio to the gaseous fluid within the prescribed transverse upper and lower bounds along the curvilinear transverse direction. E.g., within 90% and 110% of the theoretical evaporation rate.

Scaling acoustic quieting: Since noise is generated by compressor stages, the quieting fluid delivery rates described in these configurations are preferably scaled for other pressure ratios in about the proportion to the natural log of the cumulative compression ratio BETA of the gaseous fluid, "LN BETA". The quieting fluid delivery described is preferably scaled by about the average mass flow ratio F of the unevaporated cooling liquid mist enveloped by the gaseous fluid being compressed to the mass of that enveloping gaseous fluid flow. E.g., a 2 dB reduction with a BETA of 20 and average liquid to gas mass flow ratio F of 0.10 results in a quieting of at least about 1 dB times the product of (the flow ratio F times the natural log of BETA). i.e., 1 dB*(0.10*2)=2 dB.

The acoustic noise generation may be further reduced by reducing the gaseous fluid low. The noise is expected to scale by the portion of the noise due to compressor stages to the total compressor noise generation. E.g., the acoustic quieting may be proportional to about 67% of the reduction in gaseous fluid mass flow rate. Thus about a 50% reduction in gaseous fluid flow by delivering quieting liquid mist is projected to reduce the quieting by at least about 2 dB.

Cooling Spray Orifices with Acoustic Duct Liners: With reference to FIG. 16, in some embodiments, the acoustic dampening provided by these cooling liquid flows may be combined with one or more noise attenuation components. For example, progressive wet compression droplet delivery is preferably provided along with passive acoustic damping 650 in one or more locations upstream, downstream and/or alongside the centrifugal rotor 620. Cooling fluid manifolds and liquid spray orifices are preferably configured with such dampers 650 to facilitate delivery of cooling fluid into the gaseous fluid being compressed. Prior art acoustic damping may provide 5 dB to 13 dB of noise reduction.

Reducing Flow Noise Generation: Noise generation is a function of fluid mass flow, relative velocity, and turbulence. Cooling the fluid with vaporizable diluent beneficially reduces the fluid temperature and correspondingly its volume and noise generation. By providing wet compression that reduces the absolute temperature about 40% at the compressor outlet with a mass increase of 8% indicates a reduction in average flow volume within the compressor of about 17% to 83% of dry compressor flows. This flow reduction is expected to result in a flow noise reduction of about 0.8 dB.

In some configurations, a diffuser and diluted combustion system or other reactor system are preferably configured downstream of the progressive wet compressor. The diffuser and combustor or reactor system are further configured to deliver sufficient cooling liquid into the gaseous fluid downstream of the compressor system to provide at least 80% degree of saturation of the product of reaction fluid downstream of the downstream reactor. They are more preferably configured to be able to displace up to 100% of the excess gaseous fluid used as diluent in the combustor or reactor.

Progressive wet compression is preferably used to dilute the reactant or co-reactant fluid being compressed for diluted combustion or reaction. E.g., a reactant such as a gaseous fuel, or a co-reactant such as an oxidant or air. The temperature reduction of the gaseous fluid by the cooling liquid and/or the additional diluent mass flow in the compressor reduce the downstream combustion cooling required. Further liquid diluent may be delivered downstream of the compressor. The downstream delivery of liquid diluent in one or both of upstream and downstream of the compressor outlet is preferably used to control the degree of dilution and/or cooling of the downstream combustion or reaction, and consequently the delivery temperature of the energetic fluid comprising products of reaction that exit the combustor or reactor.

These measures beneficially reduce the excess diluent reactant and/or co-reactant flow being compressed that is conventionally used to dilute and/or cool the combustion and/or reaction. E.g., excess air or excess gaseous fuel. Consequently, such progressive wet combustion and/or diluted reaction reduce the compressor flow volume, compressor size, and the associated noise generation.

More preferably, further diluent is delivered through one or more direct contactors comprising numerous orifices and configured in one or more locations upstream of the compressor, between compressors, downstream of the compressor outlet, in a downstream diffuser, and/or in a downstream combustor. These direct contactors are preferably configured using one or more of the VAST.001 Distributed Contactor technology, and the VAST.002 Trifluid Reactor technology as incorporated by reference. By such measures, further reductions in diluent excess oxidant flow with consequent reduction in the oxidant flow being compressed are preferably provided by operating the combustor progressively closer stoichiometric combustion.

By operating near stoichiometric combustion, such methods may reduce the total oxidant fluid flow and consequent compressor noise generation by about 65% to 85% or more depending on the desired combustor outlet temperature. In such configurations, the cooling liquid delivered as diluent downstream of the compressor system is preferably greater than the cooling liquid delivered within the compressor system. E.g., the total water to air ratio in the combustor may range from 25% to 60% or more. Such reductions in oxidant flow and compressor size are expected to reduce the flow caused compressor noise generation by 4.5 dB to 8.2 dB or more.

Configuring the compressor system for one or more of these factors results in substantial reductions in gaseous fluid mass flow, and turbulence within the compressor, this reducing the gross noise generation. When combined with viscous inertial damping from progressive wet compression, the overall reduction in compressor noise due to wet compression with wet combustion is expected to be at least 5 dB and preferably exceeds 10 dB.

Pressure Ratio vs Temperature Interference Tolerance: Compressors are commonly limited by rotor to housing clearances relative to tolerances and differential thermal expansion from stationary to design operation. Progressive wet compression reduces the fluid temperature increase relative to dry compression. This reduces the difficulty of the operational task of maintaining rotor to housing tolerances with operational temperature changes from stopped to full operating pressures and temperatures, and for changes in inlet flow or ambient temperature.

The cool overspray progressive wet compression configuration of Table 1 and Table 2, reduced the temperature increase to about 26.4% of temperature increase for dry compression. This wet compression configuration provided at least 30% progressive saturation by the vaporizable liquid in the gaseous fluid, nominally about 100% saturation, and showed overspray of about 2%.

Such configurations potentially enable increase the BETA Tolerance ratio BT, of the natural log of the cumulative pressure ratio BETA, "LN BETA," to the relative rotor interference tolerance. Here, the relative rotor interference tolerance is the rotor to duct gap at operating speed divided by the rotor radius. The ratio BT may be increased by some combination of reducing the relative interference tolerance, adding more compressor stages, and/or by increasing the compression ratio of one or more stages.

E.g., nominally by reducing the temperature interference tolerance by up to about 73%, and/or increasing LN BETA by up to about 377%. (e.g., until the same relative change in airfoil to duct gap due to gas temperature increase is experienced as with dry compression, nominally assuming temperature increases about with LN BETA.)

In some configurations, such progressive wet compression may be used to increase the BETA Tolerance ratio BT, preferably by at least about 30%, more preferably by about 100%, further preferably by about 300%, relative to the equivalent dry compression technology, for similar relevant art manufacturing technology. i.e., for the same relative rotor interference tolerances and rotational speed used by relevant art dry compression, with appropriate increases in the compressor duct design pressure as needed for design safety. Reducing the tolerance improves compressor efficiency. Such progressive wet cooling promises to significantly reduce compressor capital and operating costs.

Generalization

From the foregoing description, it will be appreciated that a novel approach for cooling gaseous fluids during compression has been disclosed using one or more methods described herein. While the components, techniques and other aspects of the invention have been described with a certain degree of particularity, it is manifest that many changes may be made in the specific designs, constructions and methodology herein above described without departing from the spirit and scope of this disclosure.

Where specific parameters such as fluid flow rates, fluid properties, temperatures and compressor ratios are given, they are generally for illustrative purpose and are not prescriptive. Of course, as the mechanical and chemical process engineer will appreciate, other suitable components and configurations may be efficaciously utilized in accordance with the nature of the turbo-machinery utilized and for which specific flows, pressure ratios, temperatures and compositions are desired. Appropriate components and configurations may be utilized, as needed or desired, giving due consideration to the goals of achieving one or more of the benefits and advantages as taught or suggested herein.

Where specific components of a typical fluid compression or power system are described, various apparatus components may be utilized provided that they serve to achieve the appropriate fluid mixing and compression in accordance with the novel approach described herein. Where the terms gaseous fluid, cooling liquid, fuel, hydrocarbon, diluent, coolant, water, air, oxygen, oxidant, reactant or co-reactant have been used, the methods are generally applicable to other combinations of those fluids or to other combinations of other reactive, diluent and cooling fluids. Where vaporizable cooling liquid, gaseous fluid, or compressed gaseous fluid, are used, various other reactive, reacted, cooling or diluent fluids may be used possibly including elevated temperatures and/or elevated pressures. Where a compressor is shown, two or more compressors may be used, and water and/or steam delivery may be used before or between them to cool the compressed fluid and reduce the work.

Where a multiple fluid delivery and/or axial compression stages or regions are shown, one or more combinations of such fluid delivery and/or axial, radial and/or centrifugal compression stages may be efficaciously utilized. The methods may be used for other turbomachines such as turbines. Where assembly methods or a specific sequence of system components are described, various alternative assembly methods and sequencing may be efficaciously utilized to achieve configurations to achieve the benefits and advantages of one or more of the embodiments as taught or suggested herein.

Similar method may be used to compress air or other gaseous fluid to other compression ratios. E.g., these may range from turbochargers with typical compression ratios of about 2 to 3, to microturbine compressors with typical compression ratios of about 4 to 7, to small compressors with typical pressure ratios of about 8 to 19, to medium compressors with typical pressure ratios of about 20 to 30, to large pressure compressors with typical compression ratios of about 31 to 45, and to high pressure compressors with compression ratios of about 46 or higher. The higher the compression ratio, the greater the benefit provided by such progressive wet compression or progressive overspray cooling.

While the components, techniques and aspects of the invention have been described with a certain degree of particularity, it is manifest that many changes may be made in the specific designs, constructions and methodology herein above described without departing from the spirit and scope of this disclosure.

Various modifications and applications of the invention may occur to those who are skilled in the art, without departing from the true spirit or scope of the invention. It should be understood that the invention is not limited to the embodiments set forth herein for purposes of exemplification, but includes the full range of equivalency to which each element is entitled.

I claim:

1. A method of cooling a gaseous fluid being compressed in at least one compressor portion distributed along a curvilinear stream wise flow; the method comprising:
   delivering a vaporizable cooling fluid to the compressor portion along a curvilinear transverse line distinct from the curvilinear stream wise flow path direction, and bounded by a first wall and a second wall,
   wherein said transverse line includes a region closer to the center of the stream wise flow and a region closer to one of the first or second walls;
   evaporating a fraction of the delivered cooling fluid in both said regions
      characterized in that the rate of cooling induced in the region closer to the center of stream wise flow is greater than the rate of cooling in the region closer to the first or second wall; and
      further characterized in that the cooling reduces the rate of heating due to compression.

2. The method according to claim 1, wherein the functional dependence of the cooling rate along the curvilinear transverse line is non-linear.

3. The method according to claim 1, wherein the cooling rate reaches a transverse maximum within about 25% to 75% of the distance between the first and second wall.

4. The method according to claim 3, wherein the cooling rate reaches a maximum closer to the centripetally inward wall than the mass weighted distribution of gaseous fluid stream wise flow within the compression stage.

5. The method according to claim 1, wherein the mass weighted transverse distribution of delivered cooling fluid delivered within a compressor stage is proportional to the desired cooling fluid delivery transverse distribution within that stage, less a transverse distribution of vaporizable cooling fluid entrained with the gaseous fluid entering that stage.

6. The method according to claim 1, wherein the mass weighted transverse distribution of injected cooling fluid delivered within a compressor stage is proportional to the desired cooling fluid delivery transverse distribution within that stage, less an evaporation weighted transverse distribution of cooling fluid entrained with the gaseous fluid entering that stage.

7. The method according to claim 1, wherein the rate of injected cooling fluid across at least one compression stage is between 60% and 250% of the flow required to saturate the gaseous fluid within that stage.

8. The method according to claim 1, wherein the average orifice size for the injection of cooling fluid is less than 10 microns.

9. The method according to claim 8, wherein the average orifice size for the injection of cooling fluid is less than 3 microns.

10. The method according to claim 1, wherein the average Sauter Mean Diameter droplet size of injected cooling fluid is less than 5 microns.

11. The method according to claim 1, wherein the noise generated during operation is reduced by at least 5 dB relative to equivalent dry compression prior art systems.

12. The method according to claim 1, wherein the ratio of the relative decrease in normalized Wet to Dry temperature ratio ("1−W/D") to natural log of pressure ratio (LN BETA) is at least 0.01.

13. The method according to claim 1, wherein at least 95% by mass of the injected coolant fluid drops are less than 20 microns Sauter Mean Diameter.

14. The method according to claim 1, wherein the mass ratio of total coolant fluid to gaseous fluid at the compressor system outlet is greater than 60% of the ratio of coolant fluid that would have been required to saturate that gaseous fluid after adiabatic compression to the same pressure ratio.

15. The method according to claim 1, further comprising configuring one or more of drop size, temperature, and/or drop velocity relative to a compressor component surface, and/or hardening that component surface, wherein controlling the kinetic impact induced stress on a turbomachine component surface to be less than a prescribed surface design stress for at least 99% of droplet impacts.

16. The method according to claim 1, further comprising one of a combustion or chemical reaction system downstream of the compressed fluid outlet in fluid communication with the exiting compressed fluid, and comprising delivering cooling liquid as diluent into the downstream combustion and/or reaction system.

17. The method according to claim 16, further comprising controlling the degree of dilution and/or cooling of the downstream combustion or reaction by controlling the cooling liquid delivered into at least one of the gaseous fluid upstream and downstream of the compressor outlet.

18. The method according to claim 17, further comprising configuring the peak to mean ratio and peak location of the transverse cooling liquid delivery distribution at a compressor stage to compensate for the transverse mass flow distribution of the gaseous fluid caused by upstream centripetal acceleration, and the projected downstream transverse motion of the cooling liquid delivered.

19. The method according to claim 1, further comprising recovering heat from the flow downstream of the compressor and using it to heat the cooling liquid.

20. The method of claim 1, further comprising controlling the attack angle of at least one stator airfoil to adjust the axial distribution of compression ratio beta for wet compression.

* * * * *